(12) United States Patent
Bernhard et al.

(10) Patent No.: US 11,592,133 B2
(45) Date of Patent: Feb. 28, 2023

(54) FLUID LINE SYSTEM WITH ADAPTER FOR CONNECTING FLUID LINES

(71) Applicant: Endress+Hauser Flowtec AG, Reinach (CH)

(72) Inventors: Holger Bernhard, Grenzach-Wyhlen (DE); Michael Lambrigger, Basel (CH); Gebhard Gschwend, Allschwil (CH); Christian Matt, Reinach (CH)

(73) Assignee: Endress+Hauser Flowtec AG, Reinach (CH)

( * ) Notice: Subject to any disclaimer, the term of this patent is extended or adjusted under 35 U.S.C. 154(b) by 35 days.

(21) Appl. No.: 17/331,771

(22) Filed: May 27, 2021

(65) Prior Publication Data
US 2021/0285588 A1  Sep. 16, 2021

Related U.S. Application Data

(62) Division of application No. 15/772,866, filed as application No. PCT/EP2016/074438 on Oct. 12, 2016, now Pat. No. 11,028,953.

(30) Foreign Application Priority Data

Nov. 4, 2015 (DE) ............... 10 2015 118 864.3

(51) Int. Cl.
*F16L 41/02* (2006.01)
*G01F 15/18* (2006.01)
*F16L 23/02* (2006.01)

(52) U.S. Cl.
CPC ............ *F16L 41/023* (2013.01); *F16L 23/02* (2013.01); *G01F 15/185* (2013.01)

(58) Field of Classification Search
CPC ......... F16L 41/023; F16L 39/00; F16L 23/02; G01F 15/185
USPC .................. 285/122.1, 124.1, 131.1, 412
See application file for complete search history.

(56) References Cited

U.S. PATENT DOCUMENTS

| | | | | |
|---|---|---|---|---|
| 2,284,937 | A * | 6/1942 | Wood | 285/122.1 |
| 5,265,547 | A * | 11/1993 | Daws | 285/131.1 |
| 6,122,911 | A * | 9/2000 | Maeda | 285/131.1 |
| 9,897,244 | B1 * | 2/2018 | Duvall | F16L 41/023 |
| 2010/0065140 | A1 * | 3/2010 | Joynson | F16L 41/023 |
| 2014/0299198 | A1 * | 10/2014 | Diehl | F16L 41/023 |
| | | | | 285/131.1 |

* cited by examiner

*Primary Examiner* — Zachary T Dragicevich
(74) *Attorney, Agent, or Firm* — Mark A. Logan; Endress+Hauser (USA) Holding, Inc.

(57) ABSTRACT

An adapter includes several connecting nozzles. Free nozzle ends of the connecting nozzles are adapted to be connected to line ends of fluid lines. The adapter includes, for guiding flowing fluid in and then out, two mutually separated, tubular flow channels. Moreover, the adapter includes a projection, which extends from the nozzle end with a length to a free projection end remote therefrom. A fluid line system formed by means of the adapter comprises, furthermore, a fluid line with, enveloped by a wall, a lumen. The fluid line can be connected with its line end to the connecting nozzle of the adapter in such a manner that the projection protrudes inwardly into the lumen of the fluid line to form two tubular chambers of the fluid line mutually separated by the projection and adapted for guiding through flowing fluid.

16 Claims, 17 Drawing Sheets

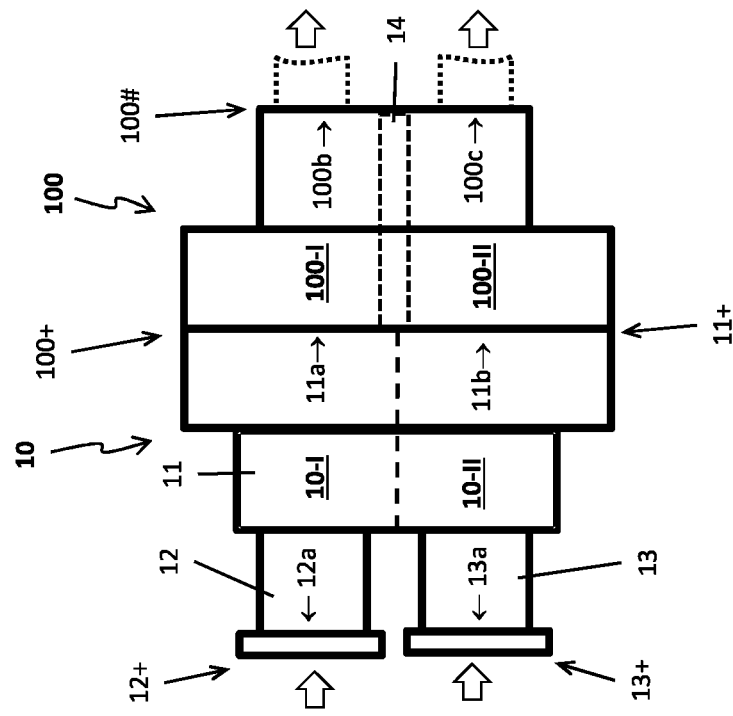
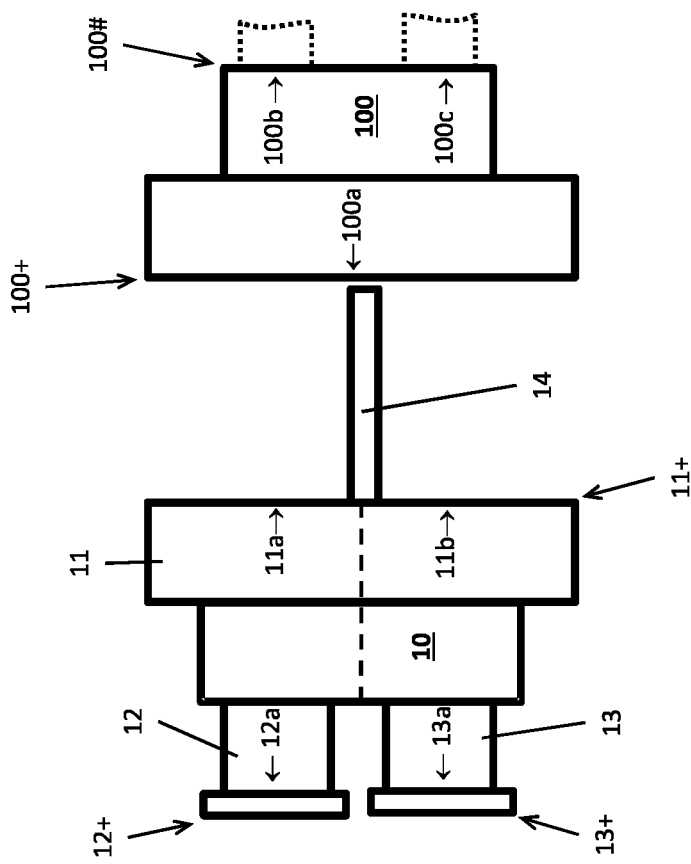
*Fig. 3b*
*Fig. 3a*

FLUID LINE SYSTEM WITH ADAPTER FOR CONNECTING FLUID LINES

CROSS-REFERENCE TO RELATED APPLICATIONS

The present divisional application is related to and claims the priority benefit of U.S. patent application Ser. No. 15/772,866, filed May 2, 2018, now U.S. Pat. No. 11,028, 953, International Patent Application No. PCT/EP2016/074438, filed Oct. 12, 2016, and German Patent Application No. 10 2015 118 864.3, filed Nov. 4, 2015, the entire contents of which are incorporated herein by reference.

TECHNICAL FIELD

The invention relates to an adapter for connecting fluid lines serving for guiding a flowing fluid as well as to a fluid line system formed by means of such an adapter.

BACKGROUND

Each of Published International Applications, WO-A 2006/091199, WO-A 2008/024112, and WO-A 2008/013545 discloses a fluid line system, which has a first fluid line embodied as a line branching—referred to, at times, also as a distributor-, collecting- or Y-section or even as a flow divider—with a (Y-shaped) lumen enveloped by a wall and extending from a first flow opening located in a first line end of the first fluid line both to a second flow opening located in a second line end of the first fluid line as well as also to a third flow opening spaced from the second flow opening and located in the second line end of the first fluid line, a second fluid line embodied as a rigid tube and having a lumen enveloped by a wall and extending from a first flow opening located in a first line end of the second fluid line to a second flow opening located in a second line end of the second fluid line, as well as at least a third fluid line embodied as a rigid tube and having a lumen enveloped by a wall and extending from a first flow opening located in a first line end of the third fluid line to a second flow opening located in a second line end of the third fluid line. The first fluid line is connected with its second line end both with the first line end of the second fluid line as well as also with the first line end of the third fluid line, in such a manner that both the lumen of the second fluid line as well as also the lumen of the third fluid line communicate with the lumen of the first fluid line, or that the first flow opening of the second fluid line opens into the second flow opening of the first fluid line and the first flow opening of the third fluid line opens into the third flow opening of the first fluid line. The walls of the fluid lines can be composed, for example, of a metal, such as e.g. a stainless steel. The second fluid line is adapted to be connected with its second line end with another fluid line of the fluid line system, for example, a (metal-) pipe. Analogously thereto, the third fluid line is adapted to be connected with its second line end with an additional fluid line of the fluid line system, for example, an additional (metal-) pipe. Both the second line end of the second fluid line as well as also the second line end of the third fluid line are collared by corresponding connecting flanges. At least the second fluid line and the third fluid line, in given cases, also the first fluid line, are, in each case, components of a vibronic measuring transducer serving for generating at least one measurement signal corresponding to the at least one measured variable, wherein the measuring transducer is connected with a corresponding measuring device-electronics to form a Coriolis-mass flow-measuring device, a density-measuring device and/or a viscosity-measuring device and wherein the second fluid line and the third fluid line are adapted to are flowed through by fluid to be measured and then to be caused to vibrate for the purpose of generating the at least one measurement signal. The fluid line systems shown in WO-A 2006/091199, WO-A 2008/024112, and WO-A 2008/013545 can, in each case, be components of a dispensing system for fuels, for example, gasoline, diesel or even compressed natural gas (CNG), with two separate withdrawal locations, namely locations fed either via the second fluid line or via the third fluid line, or, in conjunction with additional components, form such a dispensing system serving for guiding a fluid flow to be divided into two separate fluid streams.

Moreover, it is shown in WO-A 2008/024112 that such a fluid line system can also be so applied that the above-referenced first fluid line serves namely not as a line branching, but, instead, alternatively as a line junction, for example, in order to bring together, and to mix, in the first fluid line, separate fluid streams, namely fluid streams guided through the second fluid line, and the third fluid line, to the first fluid line, in given cases, also fluid streams with mutually differing compositions. Furthermore, there is described in the applicants unpublished international patent application PCT/EP2015/070020 the use of a fluid line system of the above indicated type as a component of a transfer point serving for transfer of a fluid, for example, a dispersion, a gas or a liquid, for traffic in goods where calibration is obligatory. The fluid line system is likewise formed by means of a vibronic measuring transducer having two fluid lines for flow in parallel and is provided to measure at least one of the measured variables, mass flow rate, total mass flow, volume flow rate, total volume flow, density, viscosity or temperature of the fluid to be transferred from a supply—into a withdrawal container remote therefrom in, in each case, a predetermined amount, wherein the fluids have fluid temperatures of less than −40° C., and can be, for example, a liquefied gas containing methane and/or ethane and/or propane and/or butane, or a liquefied natural gas (LNG). The two fluid lines can be accommodated in a corresponding transducer-protective housing together with an exciter mechanism serving for exciting mechanical oscillations of the fluid lines and a sensor arrangement serving for registering the oscillations of the fluid lines and for generating the at least one measurement signal. For the purpose of implementing two alternative, equally as well alternately openable and closable, flow paths of the aforementioned fluid line system, such is, furthermore, adapted in at least one selectively activatable operating mode, to divide up the fluid stream fed from the withdrawal container, firstly, into two separately guided, fluid streams, to guide the fluid streams through the aforementioned two parallel fluid lines of the measuring transducer and thereafter, namely first downstream of the fluid lines of the measuring transducer, to bring the streams back together.

A disadvantage of each of the aforementioned fluid systems is, however, that the vibronic measuring transducer used therefor is, in each case, a special device, namely one deviating as regards its construction from the otherwise typically offered, conventional, measuring transducers established in industrial measuring- and automation technology, i.e. that for implementing such a fluid system a special, equally as well complicatedly manufactured, measuring transducer must be used. Very widely distributed are, among others, however, such (conventional) measuring transducers, which, as regards mechanical construction and operation, correspond essentially to the measuring transducers shown in European Patent, EP-A 816 807, US-A 2001/0037690, US-A 2008/0184816, which U.S. Pat. No. 4,823,613, the U.S. Pat. Nos. 5,602,345, 5,796,011, and Published International Applications, WO-A 90/15310, WO-A 00/08423, WO-A 2006/107297, WO-A 2006/118557, WO-A 2008/059262, WO-A 2009/048457, WO-A 2009/078880, WO-A 2009/120223, WO-A 2009/123632, WO-A 2010/059157, WO-A 2013/006171 or WO-A 2013/070191. The therein described measuring transducers, which, for example, serve for generating Coriolis forces dependent on a mass flow rate of the flowing fluid, are, especially, provided and accordingly adapted to be inserted into the course of a pipeline, in such a manner that a fluid stream entering the measuring transducer is first divided within the measuring transducer, for the purpose of the measuring, into two separate fluid streams, and that the fluid streams are, also within the measuring transducer, led back together to form a single fluid stream, so that the particular measuring transducer acts flow technologically virtually as a single tube. Additionally, the measuring transducer can by means of standard flange connections be connected, very simply and without additional technical effort, to the corresponding segments of the pipeline. Accordingly, such conventional measuring transducers have supplementally to the aforementioned three fluid lines at least a fourth fluid line constructed essentially equally to the first fluid line (here most often formed as a connecting nozzle provided with a (standard-)connecting flange) and having a lumen enveloped by a wall and extending from a first flow opening located in a first line end of the fourth fluid line both to a second flow opening located in a second line end of the fourth fluid line as well as also to a third flow opening located spaced from the second flow opening in the second line end of the fourth fluid line. The fourth fluid line is connected with its second line end both with the second line end of the second fluid line as well as also with the second line end of the third fluid line, in such a manner the both the lumen of the second fluid line as well as also the lumen of the third fluid line communicate with the lumen of the fourth fluid line, and that the first flow opening of the second fluid line opens into the second flow opening of the fourth fluid line and the first flow opening of the third fluid line opens into the third flow opening of the fourth fluid line. As a result, such a conventional measuring transducer includes both a line branching —, depending on adapted position, or flow direction, formed by the first fluid line or the fourth fluid line—as well as also a line junction—in corresponding manner formed by the fourth fluid line, or the first fluid line—and such a measuring transducer provides additionally two flow paths connected for parallel flow, namely in paths leading through the second fluid line and the third fluid line. Measuring transducers of the aforementioned type, not least of all also measuring transducers serving for generating Coriolis forces dependent on a mass flow rate of the flowing fluid, are, moreover, also produced by the applicant and sold together with suitably tailored measuring electronics as Coriolis-mass flow-measuring devices, respectively as Coriolis-mass flow/density-measuring devices, for example, under the designations "Promass F 200", PROMASS G 100", "PROMASS O 100", "PROMASS 83E", "PROMASS 84F", "CNGmass", "LPGmass" or "Dosimass".

Although also for the manufacture of the aforementioned special measuring transducers, for example, according to the above mentioned WO-A 2006/091199, WO-A 2008/024112, and WO-A 2008/013545, largely the same individual components can be utilized as for manufacture of conventional measuring transducers of the aforementioned type, still a considerable extra effort is required for the special measuring transducers, not least of all as regards organizing corresponding production flows, providing special operating means, performing corresponding permitting procedures, and establishing corresponding calibration methods. As a result, the creation costs for such special measuring transducers, which would also only be required in comparatively small piece numbers, compared with the creation costs for a conventional measuring transducer of equal nominal diameter, would be disproportionately high, so that the economic feasibility of such technical solutions would short- and midterm still remain in question.

SUMMARY

Taking this into consideration, an object of the invention is so to improve fluid line systems of the aforementioned type, namely fluid line systems, in the case of which two independent fluid streams are led through two fluid lines and thereafter merged to form a combined fluid stream, or fluid line systems, in the case of which each of two independent fluids flow through two fluid lines of one and the same measuring transducer, that the fluid line systems are manufacturable also by means of conventional vibronic measuring transducers, respectively to provide technical means, which enables integrating a conventional vibronic measuring transducer with at least two fluid lines, in each case, opening both into a line branching as well as also into a line junction very simply into such a fluid line system.

For achieving the object, the invention resides in an adapter for connecting fluid lines serving for guiding a flowing fluid, which adapter comprises:

a first connecting nozzle, of which a free nozzle end is adapted to be connected with a line end (for example, a line end collared by or with a connecting flange) of a fluid line, for example, a fluid line formed as a rigid and/or tubular connecting nozzle;

a second connecting nozzle, of which a free nozzle end is adapted to be connected with a line end (for example, a line end collared by or with a connecting flange) of a fluid line, for example, a fluid line formed as a rigid and/or circularly cylindrical tube;

a third connecting nozzle, of which a free nozzle end is adapted to be connected with a line end (for example, a line end collared by or with a connecting flange) of a fluid line, for example, a fluid line formed as a rigid and/or circularly cylindrical tube;

two mutually separated, tubular, flow channels adapted, in each case, for guiding fluid flowing in and then out, of which a first flow channel extends from a flow opening of the second connecting nozzle located in the free nozzle end of the second connecting nozzle to a first flow opening of the first connecting nozzle located in the free nozzle end of the first connecting nozzle, and a second flow channel extends from a flow opening of the third connecting nozzle located in the free nozzle end of the third connecting nozzle to a second flow opening of the first connecting nozzle located in the free nozzle end of the first connecting nozzle; as well as a projection, for example, a plate-shaped and/or disk like projection, bordering on a region of the free nozzle end of the first connecting nozzle located between the first flow opening and the second flow opening and extending from the free nozzle end of the first connecting nozzle with a length to a free projection end remote from the free nozzle end.

Furthermore, the invention resides also in a fluid line system, which comprises such an adapter as well as a first fluid line—, for example, a first fluid line embodied as a connecting nozzle and/or as a line branching—with, enveloped by a wall, a lumen, which extends from a first flow opening located in a first line end of the first fluid line both to a second flow opening located in a second line end of the first fluid line as well as also to a third flow opening located spaced from the second flow opening in the second line end of the first fluid line.

Furthermore, the invention resides also in using such a fluid line system for ascertaining measured values for at least one measured variable—, for example, a mass flow rate, a total mass flow, a volume flow rate, a total volume flow, a density, a viscosity or a temperature—of a fluid to be transferred, for example, a liquefied gas, for example, a methane and/or ethane and/or propane and/or butane containing, liquefied gas and/or a liquefied natural gas (LNG), or a compressed gas, for example, a compressed natural gas (CNG).

In a first embodiment of the adapter of the invention, the projection is adapted to be inserted into a lumen of the fluid line enveloped by a wall of a fluid line to be connected to the free nozzle end—, for example, to form two tubular chambers of the fluid line mutually separated by the projection and adapted, in each case, for guiding through flowing fluid—; this, for example, in such a manner that there are formed in the lumen of the fluid line a tubular first chamber communicating with the first flow channel of the adapter as well as a tubular second chamber communicating with the second flow channel of the adapter. Developing this embodiment of the invention, it is, additionally, provided that a lateral surface of the projection is embodied at least in certain regions as a sealing surface, for example, in such a manner that mutually spaced portions of the lateral surface are adapted to contact an, in each case, corresponding portion of the wall of the fluid line facing the lumen of the fluid line to be connected to the free nozzle end. For this, a first portion of the lateral surface of the projection can be adapted to contact a corresponding first portion of the wall of the fluid line, respectively a second portion of the lateral surface remote from the first portion of the lateral surface can be adapted to contact a corresponding second portion of the wall of the fluid line, consequently a second portion of the wall remote from the first portion of the wall.

In a second embodiment of the adapter of the invention, it is provided that the projection is axisymmetric, at least relative to an imaginary longitudinal axis extending from the free nozzle end to the free end.

In a third embodiment of the adapter of the invention, it is provided that a wall of the adapter surrounding the first flow channel is at least partially, for example, also predominantly or completely, composed of metal.

In a fourth embodiment of the adapter of the invention, it is provided that a wall of the adapter surrounding the second flow channel is composed at least partially, for example, also predominantly or completely, of metal, for example, the same metal as that of a wall surrounding the first flow channel, In a fifth embodiment of the adapter of the invention, it is provided that the projection is composed at least partially, for example, also predominantly or completely, of metal, for example, the same metal as that of a wall surrounding the first flow channel and/or the same metal as that of a wall surrounding the second flow channel.

In a sixth embodiment of the adapter of the invention, it is provided that the projection has a breadth, which is greater than a diameter of the first flow opening of the first connecting nozzle and/or greater than a diameter of the second flow opening of the first connecting nozzle.

In a seventh embodiment of the adapter of the invention, it is provided that the first connecting nozzle is tubular.

In an eighth embodiment of the adapter of the invention, it is provided that the free nozzle end of the first connecting nozzle is collared by a connecting flange.

In a ninth embodiment of the adapter of the invention, it is provided that the second connecting nozzle is tubular.

In a tenth embodiment of the adapter of the invention, it is provided that the free nozzle end of the second connecting nozzle is collared by a connecting flange.

In an eleventh embodiment of the adapter of the invention, it is provided that the third connecting nozzle is tubular.

In a twelfth embodiment of the adapter of the invention, it is provided that the free nozzle end of the third connecting nozzle is collared by a connecting flange.

In a thirteenth embodiment of the adapter of the invention, it is provided that the second connecting nozzle and the third connecting nozzle are of equal construction.

In a first embodiment of the fluid line system of the invention, it is provided that the adapter is connected with the first fluid line; this, for example, in such a manner that both the first flow channel of the adapter as well as also the second flow channel of the adapter open into the lumen of the first fluid line, and/or in such a manner that the first fluid line is connected with its first line end to the free nozzle end of the first connecting nozzle.

In a second embodiment of the fluid line system of the invention, it is provided that the first fluid line is connected with its first line end to the adapter, for example, via its first connecting nozzle; this, for example, in such a manner that the projection of the adapter protrudes inwardly into the lumen of the first fluid line to form two tubular chambers of the first fluid line mutually separated by the projection and adapted, in each case, for guiding through flowing fluid.

In a third embodiment of the fluid line system of the invention, it is provided that the first fluid line is connected with its first line end to the first connecting nozzle of the adapter in such a manner that the projection of the adapter protrudes inwardly into the lumen of the first fluid line —, for example, to form two tubular chambers of the first fluid line mutually separated by the projection and adapted, in each case, for guiding through flowing fluid —; this, for example, also in such a manner that there are formed in the lumen of the first fluid line a tubular first chamber communicating with the first flow channel of the adapter as well as a tubular second chamber communicating with the second flow channel of the adapter.

In a fourth embodiment of the fluid line system of the invention, it is provided that the first fluid line is formed by means of a distributor piece of a measuring transducer —, for example, formed as a line branching or line junction —, for example, of a vibronic measuring transducer and/or a measuring transducer of a Coriolis mass flow measuring device —.

In a fifth embodiment of the fluid line system of the invention, it is provided that a distributor piece of a measuring transducer is formed by means of the first fluid line —, for example, a distributor piece embodied as a line branching or line junction—, for example, a distributor piece of a vibronic measuring transducer and/or a measuring transducer of a Coriolis mass flow measuring device —.

In a sixth embodiment of the fluid line system of the invention, it is provided that the projection has a contour, which, at least in certain regions, is —, for example, predominantly or completely—complementary to a contour of the wall of the fluid line corresponding to a longitudinal section of the first fluid line.

In a seventh embodiment of the fluid line system of the invention, it is provided that a first portion of the lateral surface of the projection contacts a corresponding first portion of the wall of the first fluid line, for example, to form a seal limiting or impeding a flowing through of fluid. Developing this embodiment of the invention further, it is, additionally, provided that a second portion of the lateral surface remote from the first portion of the lateral surface —, for example, an equal sized second portion and/or a second portion lying opposite the first portion— contacts a corresponding second portion of the wall of the first fluid line remote by the first portion of the wall —, for example, in order to form a seal limiting or impeding a flowing through of fluid.

In an eighth embodiment of the fluid line system of the invention, it is provided that the lumen of the first fluid line has a length, measured as a shortest separation between the first line end of the fluid line and the second line end of the fluid line, and the length of the projection amounts to no more than the length of the lumen of the first fluid line. Developing this embodiment of the invention, it is, additionally, provided that the first fluid line has, arranged within its lumen, a partition —, for example, a plate-shaped and/or disk like partition —, which extends from a region located between the second flow opening of the first fluid line and the third flow opening of the first fluid line with a length, which is less than the length of the lumen of the first fluid line, to a free intermediate wall end remote from the second line end of the first fluid line. The partition can, for example, also have a breadth, which equals a caliber of the first fluid line and/or equals a diameter of the first flow opening of the first fluid line.

In a ninth embodiment of the fluid line system of the invention, it is provided that the projection of the adapter, with a portion of the lateral surface facing the second line end of the first fluid line, contacts a portion of the wall —, for example, a portion formed as a sealing surface —, located between the second flow opening and the third flow opening and facing the lumen of the first fluid line, for example, to form a seal limiting or impeding a flowing through of fluid.

In a tenth embodiment of the fluid line system of the invention, it is provided that a lateral surface of the projection of the adapter, for example, a lateral surface embodied at least in certain regions as a sealing surface, contacts the wall of the first fluid line at least partially —, for example, to form a seal limiting or impeding a flowing through of fluid —; this, for example, also in such a manner that mutually spaced portions of the lateral surface contact corresponding portions of the wall of the fluid line facing the lumen of the first fluid line.

In an eleventh embodiment of the fluid line system of the invention, it is provided that the first fluid line is connected with its first line end to the first connecting nozzle of the adapter in such a manner that the projection of the adapter protrudes inwardly into the lumen of the first fluid line to form two tubular chambers of the first fluid line mutually separated by the projection and serving, in each case, for guiding flowing fluid, of which two —, for example, also equally large—chambers of the first fluid line a first chamber extends from the first flow opening of the first connecting nozzle to the second flow opening of the first fluid line, equally as well not to the second flow opening of the first connecting nozzle and a second chamber extends from the second flow opening of the first connecting nozzle to the third flow opening of the first fluid line, equally as well not to the first flow opening of the first connecting nozzle; this, for example, in such a manner that the first chamber of the first fluid line communicates with the first flow channel of the adapter and the second chamber of the first fluid line communicates with the second flow channel of the adapter. Developing this embodiment of the invention, it is, additionally, provided that the first flow channel of the adapter opens via the first flow opening of the first connecting nozzle into the first chamber of the first fluid line, and the second flow channel of the adapter opens via the second flow opening of the first connecting nozzle into the second chamber of the first fluid line; this, especially, in such a manner that the first flow channel of the adapter does not open into the second chamber of the first fluid line, and the second flow channel of the adapter does not open into the first chamber of the first fluid line.

In a twelfth embodiment of the fluid line system of the invention, it is provided that the projection has a breadth, which is less than a caliber of the first fluid line and/or less than a diameter of the first flow opening of the first fluid line.

In a thirteenth embodiment of the fluid line system of the invention, it is provided that the first fluid line is embodied as a rigid and/or at least sectionally circularly cylindrical tube.

In a fourteenth embodiment of the fluid line system of the invention, it is provided that the wall surrounding the lumen of the first fluid line is composed at least partially, for example, also predominantly or completely, of metal.

In a fifteenth embodiment of the fluid line system of the invention, it is provided that the first line end of the first fluid line is collared by a connecting flange.

In a first further development of the fluid line system of the invention, such additionally comprises:

a second fluid line with a lumen enveloped by a wall and extending from a first flow opening located in a first line end of the second fluid line to a second flow opening located in a second line end of the second fluid line; as well as at least a third fluid line with a lumen enveloped by a wall and extending from a first flow opening located in a first line end of the third fluid line to a second flow opening located in a second line end of the third fluid line;

wherein both the second fluid line with its first line end as well as also the third fluid line with its first line end are connected, in each case, with the second line end of the first fluid line; this, for example, in such a manner that both the lumen of the second fluid line as well as also the lumen of the third fluid line communicate with the lumen of the first fluid line and/or in such a manner that the first flow opening of the second fluid line opens into the second flow opening of the first fluid line and the first flow opening of the third fluid line opens into the third flow opening of the first fluid line.

In a first embodiment of the first further development of the invention, it is, additionally, provided that the projection of the adapter has a breadth, which is less than a caliber of the first fluid line and/or less than a diameter of the first flow opening of the first fluid line, and that a diameter of the first flow opening of the second fluid line is less than the breadth of the projection.

In a second embodiment of the first further development of the invention, it is, additionally, provided that the projection of the adapter has a breadth, which is less than a caliber of the first fluid line and/or less than a diameter of the first flow opening of the first fluid line, and that a diameter of the first flow opening of the third fluid line is less than the breadth of the projection.

In a third embodiment of the first further development of the invention, it is, additionally, provided that the projection of the adapter has a breadth, which is less than a caliber of the first fluid line and/or less than a diameter of the first flow opening of the first fluid line, and that a caliber of the second fluid line is less than the breadth of the projection.

In a fourth embodiment of the first further development of the invention, it is, additionally, provided that the projection of the adapter has a breadth, which is less than a caliber of the first fluid line and/or less than a diameter of the first flow opening of the first fluid line, and that a caliber of the third fluid line is less than the breadth of the projection.

In a fifth embodiment of the first further development of the invention, it is, additionally, provided that the second fluid line is embodied as a rigid and/or at least sectionally circularly cylindrical tube.

In a sixth embodiment of the first further development of the invention, it is, additionally, provided that the wall surrounding the lumen of the second fluid line is composed at least partially, for example, also predominantly or completely, of metal.

In a seventh embodiment of the first further development of the invention, it is, additionally, provided that the third fluid line is embodied as a rigid and/or at least sectionally circularly cylindrical tube.

In an eighth embodiment of the first further development of the invention, it is, additionally, provided that the wall surrounding the lumen of the third fluid line is composed at least partially, for example, also predominantly or completely, of metal.

In a ninth embodiment of the first further development of the invention, it is, additionally, provided that the second fluid line and the third fluid line are of equal construction.

In a tenth embodiment of the first further development of the invention, it is, additionally, provided that the first fluid line is connected with its first line end to the first connecting nozzle of the adapter in such a manner that the projection of the adapter protrudes inwardly into the lumen of the first fluid line to form two tubular chambers of the first fluid line mutually separated by the projection and serving, in each case, or the guiding of through flowing fluid, of which two —, for example, also equally large—chambers of the first fluid line a first chamber extends from the first flow opening of the first connecting nozzle to the second flow opening of the first fluid line, equally as well not to the second flow opening of the first connecting nozzle and a second chamber extends from the second flow opening of the first connecting nozzle to the third flow opening of the first fluid line, equally as well not to the first flow opening of the first connecting nozzle. Developing this embodiment of the invention, it is, additionally, provided that the lumen of the second fluid line opens via the second flow opening of the first fluid line into the first chamber of the first fluid line and the lumen of the third fluid line opens via the third flow opening of the first fluid line into the second chamber of the first fluid line, or that the first flow channel of the adapter opens via the first flow opening of the first connecting nozzle into the first chamber of the first fluid line and the second flow channel of the adapter opens via the second flow opening of the first connecting nozzle into the second chamber of the first fluid line; this, especially, in such a manner that both the first flow channel of the adapter as well as also the lumen of the second fluid line, in each case, does not open into the second chamber of the first fluid line, and both the second flow channel of the adapter as well as also the lumen of the third fluid line, in each case, do not open into the first chamber of the first fluid line.

In an eleventh embodiment of the first further development of the invention, it is, additionally, provided that at least the second fluid line is a component of a measuring transducer for example, a vibronic measuring transducer or a magneto-inductive measuring transducer, serving for generating at least one measurement signal corresponding to the at least one measured variable.

In a twelfth embodiment of the first further development of the invention, it is, additionally, provided that at least the second fluid line and the third fluid line are, in each case, components of a measuring transducer, for example, a vibronic measuring transducer or a magneto-inductive measuring transducer, serving for generating at least one measurement signal corresponding to the at least one measured variable.

In a thirteenth embodiment of the first further development of the invention, it is, additionally, provided that the second fluid line and the third fluid line are, in each case, components of one and the same measuring transducer serving for generating at least one measurement signal corresponding to the at least one measured variable.

In a fourteenth embodiment of the first further development of the invention, it is, additionally, provided that at least the second fluid line is adapted to be flowed through by fluid and, during that, to be caused to vibrate. Developing this embodiment of the invention, it is, additionally, provided that also the third fluid line is adapted, for example, simultaneously with the second fluid line, to be flowed through by fluid and then, for example, simultaneously with the second fluid line, to be caused to vibrate.

In a second further development of the fluid line system of the invention, such additionally comprises:

a second fluid line with a lumen enveloped by a wall and extending from a first flow opening located in a first line end of the second fluid line to a second flow opening located in a second line end of the second fluid line;

at least a third fluid line with a lumen enveloped by a wall and extending from a first flow opening located in a first line end of the third fluid line to a second flow opening located in a second line end of the third fluid line; as well as at least one, for example, electromechanical, oscillation exciter for exciting, or maintaining, mechanical oscillations, for example, bending oscillations, at least of the second fluid line, for example, for exciting, or maintaining, mechanical oscillations of both the second fluid line as well as also the third fluid line;

wherein both the second fluid line with its first line end as well as also the third fluid line with its first line end are connected, in each case, with the second line end of the first fluid line.

In a third further development of the fluid line system of the invention, such additionally comprises:

a second fluid line with a lumen enveloped by a wall and extending from a first flow opening located in a first line end of the second fluid line to a second flow opening located in a second line end of the second fluid line;

at least a third fluid line with a lumen enveloped by a wall and extending from a first flow opening located in a first line end of the third fluid line to a second flow opening located in a second line end of the third fluid line; as well as at least a first sensor, for example, a first sensor at least mounted on the second fluid line and/or at least placed in its proximity, for producing at least a first measurement signal —, for example, an electrical signal, first measurement signal—corresponding to a measured variable of a fluid guided in the fluid line system, namely a first measurement signal having at least one signal parameter dependent on the measured variable, for example, a signal level dependent on the measured variable and/or a signal frequency dependent on the measured variable and/or a phase angle dependent on an the measured variable;

wherein both the second fluid line with its first line end as well as also the third fluid line with its first line end are, in each case, connected with the second line end of the first fluid line.

In a fourth further development of the fluid line system of the invention, such additionally comprises:

a second fluid line with a lumen enveloped by a wall and extending from a first flow opening located in a first line end of the second fluid line to a second flow opening located in a second line end of the second fluid line;

at least a third fluid line with a lumen enveloped by a wall and extending from a first flow opening located in a first line end of the third fluid line to a second flow opening located in a second line end of the third fluid line;

a first sensor, for example, a first sensor mounted at least on the second fluid line and/or at least placed in its proximity, for producing at least a first measurement signal —, for example, an electrical, first measurement signal—corresponding to a measured variable of a fluid guided in the fluid line system, namely a first measurement signal having at least one signal parameter dependent on the measured variable, for example, a signal level dependent on the measured variable and/or a signal frequency dependent on the measured variable and/or a phase angle dependent on the measured variable; as well as at least a second sensor, for example, at least a second sensor mounted on the second fluid line and/or placed at least in its proximity and/or constructed equally to the first sensor, for producing at least a second measurement signal —, for example, an electrical, second measurement signal—corresponding to the measured variable;

wherein both the second fluid line with its first line end as well as also the third fluid line with its first line end are connected, in each case, with the second line end of the first fluid line.

In a fifth further development of the fluid line system of the invention, such additionally comprises:

a second fluid line with a lumen enveloped by a wall and extending from a first flow opening located in a first line end of the second fluid line to a second flow opening located in a second line end of the second fluid line;

at least a third fluid line with a lumen enveloped by a wall and extending from a first flow opening located in a first line end of the third fluid line to a second flow opening located in a second line end of the third fluid line;

a first sensor, for example, at least a first sensor mounted on the second fluid line and/or at least placed in its proximity, for producing at least a first measurement signal —, for example, an electrical, first measurement signal—corresponding to a measured variable of a fluid guided in the fluid line system, namely a first measurement signal having at least one signal parameter dependent on the measured variable, for example, a signal level dependent on the measured variable and/or a signal frequency dependent on the measured variable and/or a phase angle dependent on the measured variable; as well as a measuring- and operating electronics electrically coupled with the first sensor;

wherein both the second fluid line with its first line end as well as also the third fluid line with its first line end are, in each case, connected with the second line end of the first fluid line. Developing this embodiment of the invention, it is, additionally, provided that the measuring- and operating electronics is adapted to process at least the first measurement signal, for example, to ascertain by means of the first measurement signal measured values for the at least one measured variable.

In a sixth further development of the fluid line system of the invention, such additionally comprises:

a second fluid line with a lumen enveloped by a wall and extending from a first flow opening located in a first line end of the second fluid line to a second flow opening located in a second line end of the second fluid line;

at least a third fluid line with a lumen enveloped by a wall and extending from a first flow opening located in a first line end of the third fluid line to a second flow opening located in a second line end of the third fluid line;

a first sensor, for example, a first sensor at least mounted on the second fluid line and/or at least placed in its proximity, for producing at least a first measurement signal —, for example, an electrical, first measurement signal—corresponding to a measured variable of a fluid guided in the fluid line system, namely a first measurement signal having at least one signal parameter dependent on the measured variable, for example, a signal level dependent on the measured variable and/or a signal frequency dependent on the measured variable and/or a phase angle dependent on the measured variable;

at least one oscillation exciter, for example, an electromechanical, oscillation exciter for exciting, or maintaining, mechanical oscillations, for example, bending oscillations, of at least the second fluid line, for example, for exciting, or maintaining, mechanical oscillations of both the second fluid line as well as also the third fluid line;

as well as a measuring- and operating electronics electrically coupled both with the first sensor as well as also with the oscillation exciter;

wherein both the second fluid line with its first line end as well as also the third fluid line with its first line end are connected, in each case, with the second line end of the first fluid line. Developing this embodiment of the invention, it is, additionally, provided that the measuring- and operating electronics is adapted to process at least the first measurement signal, for example, to ascertain by means of the first measurement signal measured values for the at least one measured variable. Developing this embodiment of the invention, it is, additionally, provided that the measuring- and operating electronics is adapted both to supply an electrical exciter signal to the oscillation exciter as well as also to process the at least first measurement signal, for example, to ascertain by means of the first measurement signal measured values for the at least one measured variable, and that the oscillation exciter is adapted to convert electrical power supplied by means of the exciter signal into mechanical power effecting mechanical oscillations of at least the second fluid line, for example, both the second fluid line as well as also the third fluid line.

In a seventh further development of the fluid line system of the invention, such additionally comprises:

a second fluid line with a lumen enveloped by a wall and extending from a first flow opening located in a first line end of the second fluid line to a second flow opening located in a second line end of the second fluid line;

at least a third fluid line with a lumen enveloped by a wall and extending from a first flow opening located in a first line end of the third fluid line to a second flow opening located in a second line end of the third fluid line; as well as a fourth fluid line —, for example, a fourth fluid line embodied as a connecting nozzle and/or as a line junction— with a lumen enveloped by a wall and extending from a first flow opening located in a first line end of the fourth fluid line both to a second flow opening located in a second line end of the fourth fluid line as well as also to a third flow opening located spaced from the second flow opening in the second line end of the fourth fluid line;

wherein both the second fluid line with its first line end as well as also the third fluid line with its first line end are connected, in each case, with the second line end of the first fluid line, and wherein both the second fluid line with its second line end as well as also the third fluid line with its second line end are connected, in each case, with the second line end of the fourth fluid line; this, for example, in such a manner that both the lumen of the second fluid line as well as also the lumen of the third fluid line communicate with the lumen of the fourth fluid line and/or in such a manner that the second flow opening of the second fluid line opens into the second flow opening of the fourth fluid line and the second flow opening of the third fluid line opens into the third flow opening of the fourth fluid line.

In a first embodiment of the seventh further development of the invention, it is, additionally, provided that the first fluid line and the fourth fluid line are of equal construction.

In a second embodiment of the seventh further development of the invention, it is, additionally, provided that the fourth fluid line is embodied as a rigid and/or at least sectionally circularly cylindrical tube.

In a third embodiment of the seventh further development of the invention, it is, additionally, provided that the wall surrounding the lumen of the fourth fluid line is composed at least partially, for example, also predominantly or completely, of metal.

In a fourth embodiment of the seventh further development of the invention, it is, additionally, provided that the first line end of the fourth fluid line is collared by a connecting flange.

In an eighth further development of the fluid line system of the invention, such additionally comprises:

a second fluid line with a lumen enveloped by a wall and extending from a first flow opening located in a first line end of the second fluid line to a second flow opening located in a second line end of the second fluid line;

at least a third fluid line with a lumen enveloped by a wall and extending from a first flow opening located in a first line end of the third fluid line to a second flow opening located in a second line end of the third fluid line; as well as a protective housing for the second fluid line and the third fluid line;

wherein the protective housing (100) has a cavity encased by a wall, for example, of a metal, within which the second fluid line and at least the third fluid line are placed.

In a first embodiment of the eighth further development of the invention, it is, additionally, provided that a first housing end of the protective housing is formed by means of the first fluid line, for example, in such a manner that the first fluid line is an integral component of the protective housing and/or that the protective housing has, laterally limiting the cavity, a side wall, which is laterally affixed to the first fluid line, for instance connected with the first fluid line by material bonding.

In a second embodiment of the eighth additional development of the invention, the fluid line system further comprises a fourth fluid line —, for example, a fourth fluid line embodied as a connecting nozzle and/or as a line junction— with a lumen enveloped by a wall and extending from a first flow opening located in a first line end of the fourth fluid line both to a second flow opening located in a second line end of the fourth fluid line as well as also to a third flow opening spaced from the second flow opening and located in the second line end of the fourth fluid line, wherein a first housing end of the protective housing is formed by means of the first fluid line, and wherein a second housing end of the protective housing is formed by means of the fourth fluid line; this, for example, in such a manner that both the first fluid line as well as also the fourth fluid line are integral components of the protective housing and/or that the protective housing has, laterally limiting the cavity, a side wall, which is affixed laterally both to the first fluid line as well as also through the fourth fluid line, or connected both with the first fluid line as well as also with the fourth fluid line by material bonding.

In a ninth further development of the fluid line system of the invention, such additionally comprises:

a second fluid line with a lumen enveloped by a wall and extending from a first flow opening located in a first line end of the second fluid line to a second flow opening located in a second line end of the second fluid line;

at least a third fluid line with a lumen enveloped by a wall and extending from a first flow opening located in a first line end of the third fluid line to a second flow opening located in a second line end of the third fluid line;

as well as a fourth fluid line —, for example, a fourth fluid line embodied as a connecting nozzle and/or as a line junction— with a lumen enveloped by a wall and extending from a first flow opening located in a first line end of the fourth fluid line both to a second flow opening located in a second line end of the fourth fluid line as well as also to a third flow opening located spaced from the second flow opening in the second line end of the fourth fluid line;

a fifth fluid line with a lumen enveloped by a wall and extending from a first flow opening located in a first line end of the fifth fluid line to a second flow opening extending lumen located in a second line end of the fifth fluid line, as well as a sixth fluid line with a lumen enveloped by a wall and extending from a first flow opening located in a first line end of the sixth fluid line to a second flow opening located in a second line end of the sixth fluid line;

wherein both the second fluid line with its first line end as well as also the third fluid line with its first line end are connected, in each case, with the second line end of the first fluid line, and wherein both the second fluid line with its second line end as well as also the third fluid line with its second line end are connected, in each case, with the second line end of the fourth fluid line.

In a first embodiment of the ninth further development of the invention, it is, additionally, provided that the fifth fluid line is embodied as a rigid and/or at least sectionally circularly cylindrical tube.

In a second embodiment of the ninth further development of the invention, it is, additionally, provided that the wall surrounding the lumen of the fifth fluid line is composed at least partially, for example, also predominantly or completely, of metal.

In a third embodiment of the ninth further development of the invention, it is, additionally, provided that the first line end of the fifth fluid line is collared by a connecting flange.

In a fourth embodiment of the ninth further development of the invention, it is, additionally, provided that the sixth fluid line is embodied as a rigid and/or at least sectionally circularly cylindrical tube.

In a fifth embodiment of the ninth further development of the invention, it is, additionally, provided that the wall surrounding the lumen of the sixth fluid line is composed at least partially, for example, also predominantly or completely, of metal.

In a sixth embodiment of the ninth further development of the invention, it is, additionally, provided that the first line end of the sixth fluid line is collared by a connecting flange.

In a seventh embodiment of the ninth further development of the invention, it is, additionally, provided that the adapter both is connected with the fifth fluid line as well as also with the sixth fluid line; this, for example, in such a manner that the first flow channel of the adapter communicates with the lumen of the fifth fluid line and the second flow channel of the adapter is connected with the lumen of the sixth fluid line and/or in such a manner that the fifth fluid line is connected with its first line end to the free nozzle end of the second connecting nozzle and the sixth fluid line with its first line end is connected to the free nozzle end of the third connecting nozzle.

In an eighth embodiment of the ninth further development of the invention, it is, additionally, provided that the fifth fluid line is connected with its first line end on the adapter —, for example, via the second connecting nozzle of the adapter —, and that the sixth fluid line is connected with its first line end to the adapter —, for example, via the third connecting nozzle of the adapter —; this, for example, in such a manner that the lumen of the fifth fluid line communicates with the first flow channel of the adapter and that the lumen of the sixth fluid line communicates with the second flow channel of the adapter.

In a ninth embodiment of the ninth further development of the invention, it is, additionally, provided that the fifth fluid line is connected —, for example, with its first line end— to the second connecting nozzle of the adapter and that the sixth fluid line is connected —, for example, with its first line end— to the third connecting nozzle of the adapter; this, for example, in such a manner that the lumen of the fifth fluid line communicates with the first flow channel of the adapter and the lumen of the sixth fluid line with the second flow channel of the adapter.

A basic idea of the invention is to provide an adapter, which has two separate flow channels for connecting fluid lines and which is suitable to construct, in simple manner, in an already existing fluid line nominally serving as a line branching, or line junction, subsequently mutually separated flow chambers communicating equally as well, in each case, with another of at least two additional fluid lines connected to the fluid line, in such a manner that, as a result, each of the flow chambers, consequently also the, in each case, corresponding fluid line can, in each case, communicate with another of the two flow channels of the adapter. The flow channels can, in turn, in each case, be connected with an additional fluid line fluidically, for example, by means of standard flange connections, so that, as a result, via each of these fluid lines a fluid stream can be guided to the adapter and from there led further via the corresponding flow channels and the thereto adjoining, subsequently formed flow chambers out to the fluid line connected in each case.

With application of an adapter of the invention, thus, for example, also a conventional measuring transducer of vibration-type with a line branching, a line junction as well as at least two fluid lines opening, in each case, both into the line branching as well as also into the line junction, consequently also a measuring transducer according to one of the aforementioned patent applications EP-A 816 807, US-A 2001/0037690, US-A 2008/0184816, U.S. Pat. Nos. 4,823,613, 5,602,345, 5,796,011, WO-A 90/15310, WO-A 00/08423, WO-A 2006/107297, WO-A 2006/118557, WO-A 2008/059262, WO-A 2009/048457, WO-A 2009/078880, WO-A 2009/120223, WO-A 2009/123632, WO-A 2010/059157, WO-A 2013/006171 or WO-A 2013/070191, or, however, for example, also a measuring transducer according to US-A 2011/0146416, US-A 2011/0265580, US-A 2012/0192658 or the applicants unpublished German patent application DE102014118367.3, can directly, especially namely by means of simple (standard-)flange connections, be integrated into a fluid line system of the aforementioned type, such as e.g. into a fluid line system, in the case of which each of two independent fluid flows obtained by dividing a centrally supplied fluid flow, in each case, is guided further through one of two fluid lines of one and the same measuring transducer also downstream, or, however, also into a fluid line system, in the case of which two independent fluid streams are guided through, in each case, one of at least two fluid lines and first downstream of the fluid lines of the measuring transducer joined together to form a common fluid stream, especially namely also into a fluid line system according to the above mentioned international patent application PCT/EP2015/070020.

With application of two adapters of the invention, a conventional measuring transducer of the type being discussed can additionally be used, for example, also for forming a measuring system, such as described in US-A 2006/0016273 or US-A 2007/0095152, in that one of the two adapters is inserted in the aforementioned manner into the fluid line nominally serving as a line branching and the other of the two adapters is inserted in the aforementioned manner into the fluid line nominally serving as a line junction.

The invention as well as advantageous embodiments thereof will now be explained in greater detail based on examples of embodiments, which are shown in the figures of the drawing. Equal, i.e. equally acting or equally functioning, parts are provided in all figures with equal reference characters; when perspicuity requires or it otherwise appears sensible, already mentioned reference characters are omitted in subsequent figures. Other advantageous embodiments or further developments, especially also combinations, of, firstly, only individually explained aspects of the invention, will become evident, furthermore, from the figures of the drawing and/or from the claims per se.

BRIEF DESCRIPTION OF THE DRAWINGS

The figures of the drawing show as follows:

FIGS. 3a, and 3b show chronologically in two schematic, side views the application of an adapter of FIGS. 1a, and 1b for forming a fluid line system;

DETAILED DESCRIPTION

Figure 1B:
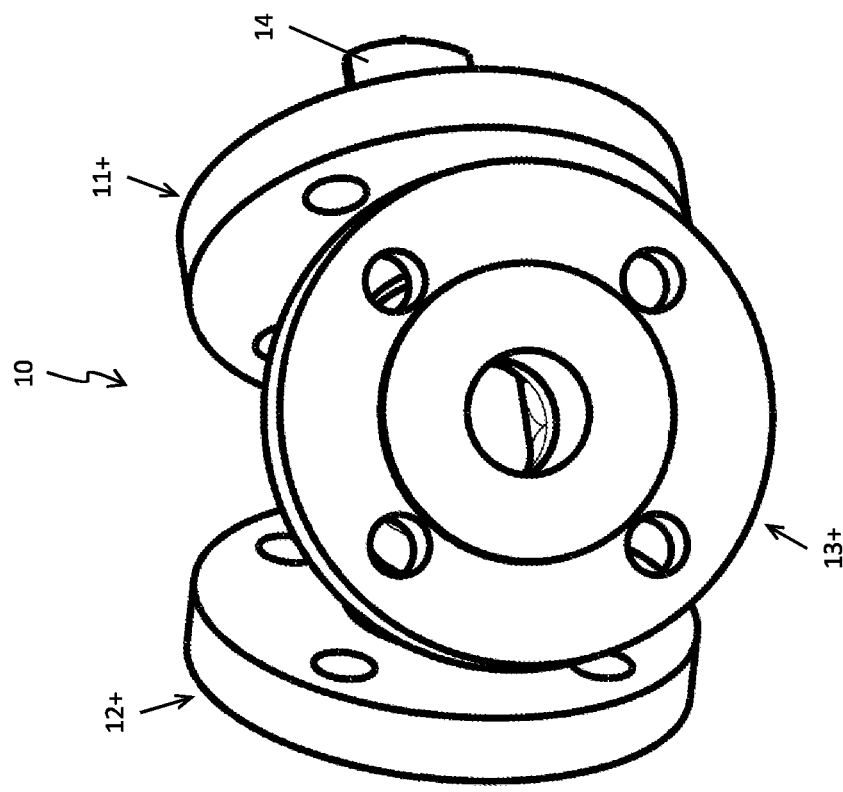
FIGS. 1a and 1b show in different perspective external views an adapter for connecting fluid lines serving for guiding a flowing fluid.
Figure 1A:
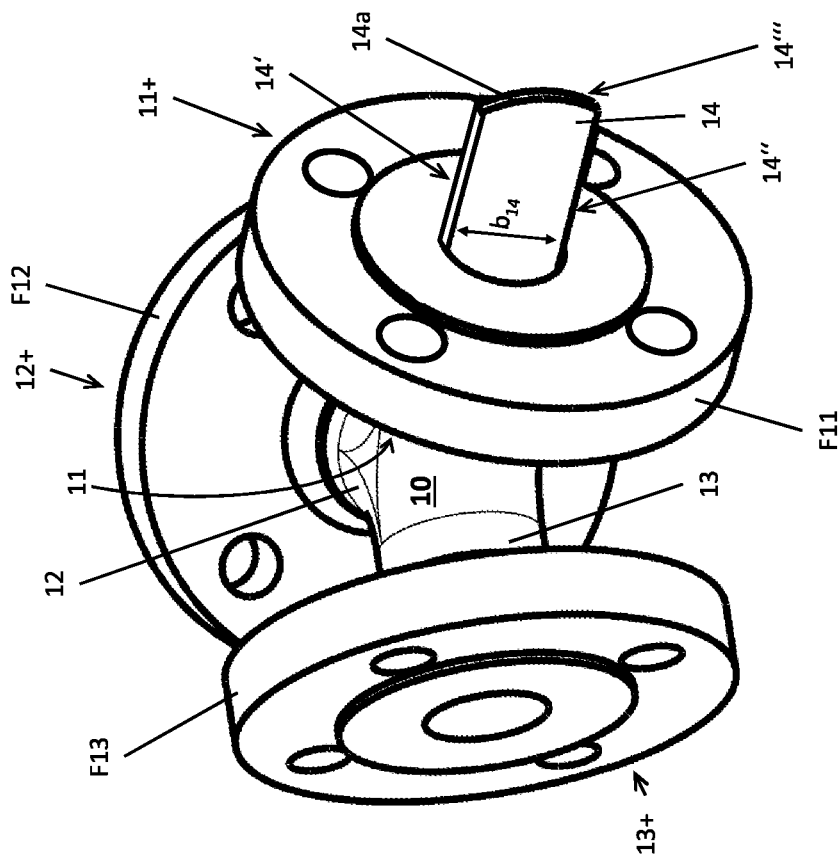
Figure 2:
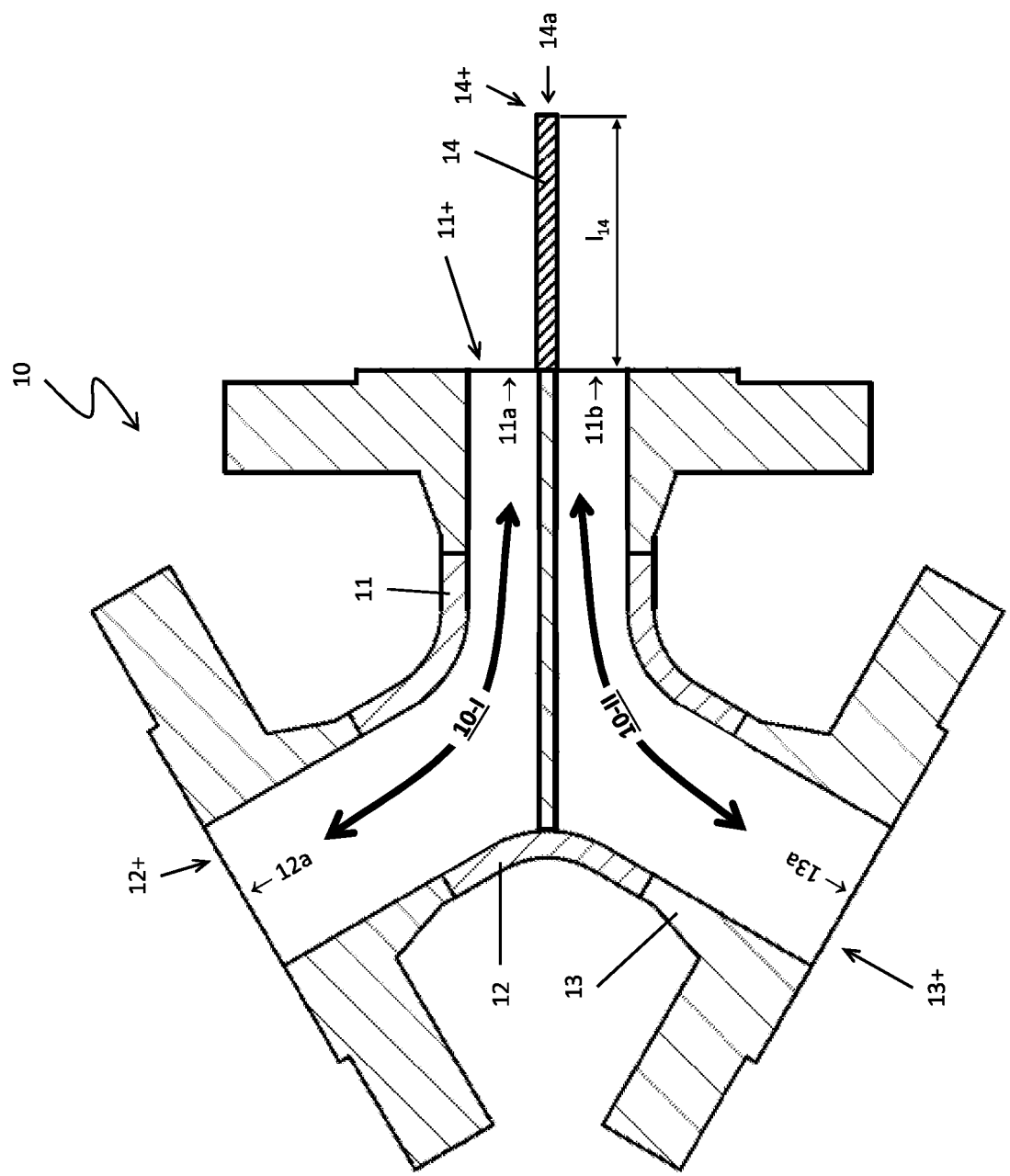
FIG. 2 shows a sectioned side view of the adapter of FIGS. 1a and 1b.

FIGS. 1*a*, and 1*b* as well as FIG. 2 show two different perspective, external views, and a sectioned side view (FIG. 2) of an adapter 10, which serves to connect together fluid lines, for example, fluid lines embodied as tubes, used for guiding a flowing fluid and —, as well as also schematically shown in FIGS. 3*a*, 3*b*, 4, 5, 6*a*, 6*b* and 7 to 12 or as directly evident from a combination of the figures— to form together with the fluid lines a fluid line system. The fluid line system can be e.g. a component of a measuring system, or can comprise such a measuring system, serving for measuring at least one measured variable of a flowing fluid and be formed, for example, by means of a Coriolis mass flow measuring device, respectively by means of a density measuring device and/or as a transfer point for traffic in goods where calibration is obligatory. Especially, the adapter 10 can also be used to integrate, for example, a vibronic, measuring transducer, or its fluid lines, into the course of a pipeline system, in given cases, also subsequently into the course of an already existing pipeline system.

The adapter 10 includes a —, for example, tubular, or hollow cylindrical—first connecting nozzle 11, a —, for example, tubular, or hollow cylindrical—second connecting nozzle 12 as well as a —, for example, tubular, or hollow cylindrical and/or constructed equally to connecting nozzle 12—third connecting nozzle 13. Furthermore, the adapter 10 includes two mutually separated, tubular flow channels 10-I, 10-II, in each case, adapted for guiding in and then out flowing fluid, of which a first flow channel 10-I extends from a flow opening 12*a* of the connecting nozzle 12 located in a free nozzle end 12+ of the connecting nozzle 12 to a first flow opening 11*a* of the connecting nozzle 11 located in a free nozzle end 11+ of the connecting nozzle 11 and a second flow channel 10-II extends from a flow opening 13*a* of the connecting nozzle 13 located in a free nozzle end 13+ of the connecting nozzle 13 to a second flow opening 11*b* the connecting nozzle 11 likewise located in the free nozzle end 11+ of the connecting nozzle 11. Moreover, the adapter 10 of the invention comprises a projection 14 —, for example, a plate-shaped and/or disk like projection 14 —, bordering on a region of the free nozzle end 11+ of the connecting nozzle 11 located between the flow opening 11*a* and the flow opening 11*b*. Projection 14 extends starting from the free nozzle end 11+ with a length 114 to a free projection end 14+ remote from the free nozzle end 11+. The above-referenced region of the free nozzle end 11+ bordering on the projection 14 is at least partially formed both by an end region, or end face, of a wall enveloping the first flow channel 10-I, for example, a wall of metal, as well as also by an end region, or end face, of a wall enveloping the second flow channel 10-II, for example, a wall of metal.

In an additional embodiment of the invention, the projection 14 is composed at least partially, for example, also predominantly or completely, of metal, for example, a stainless steel. The metal can be, for example, the same material, as that, of which the wall surrounding the first flow channel is at least partially, especially predominantly or completely, composed, or of which the wall surrounding the second flow channel is at least partially, especially predominantly or completely, composed. The projection 14 can accordingly also be secured by means of a material bonded connection, for example, a welded- or a soldered or brazed connection, on which aforementioned region of the free nozzle end 11+. The projection 14 and the two aforementioned walls can, however, for example, also be integral components of one and the same formed part, for example, a cast and/or milled out, formed part.

Figure 4:
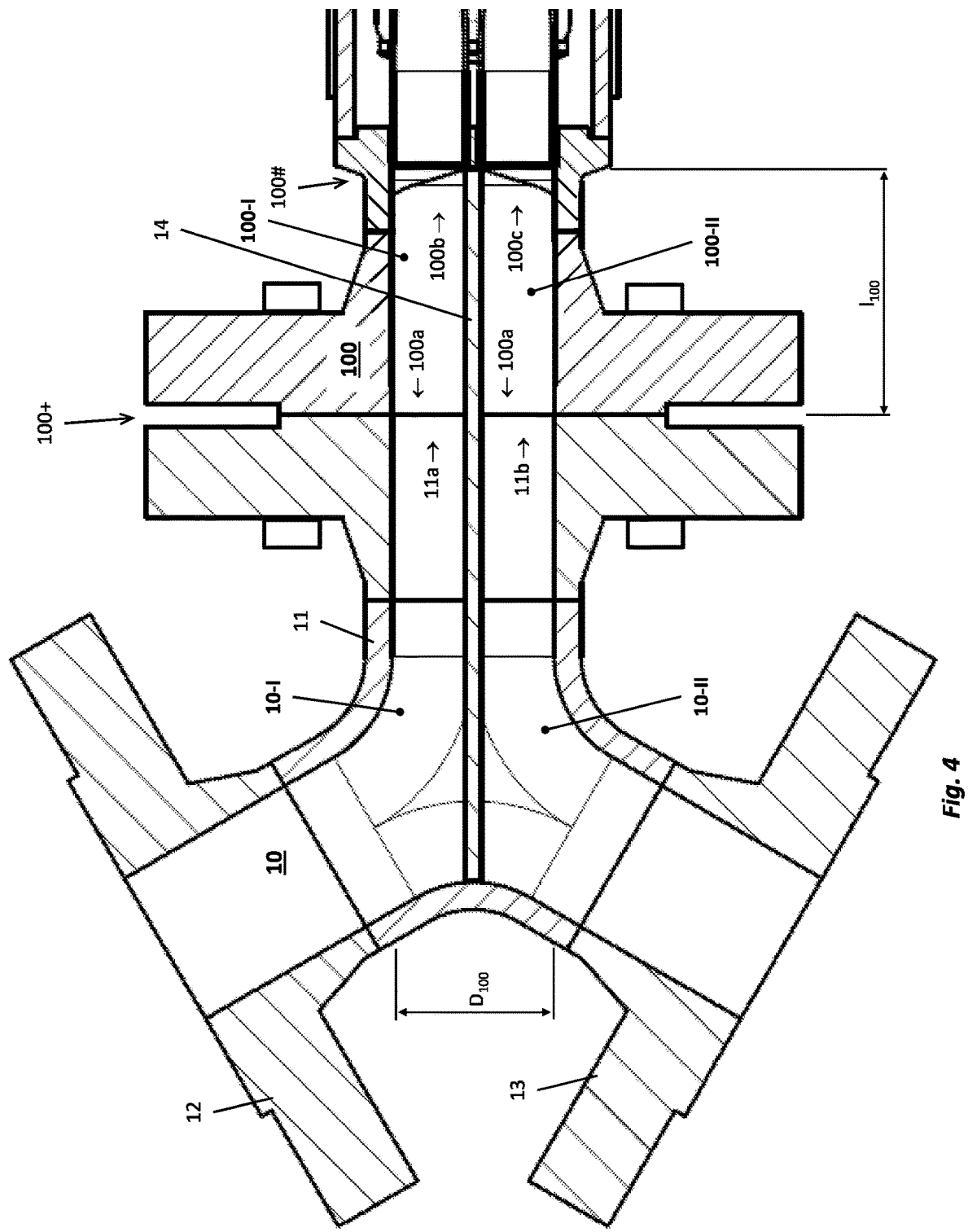
FIG. 4 shows a sectioned side view of the fluid line system of FIG. 3b.

A free nozzle end 11+(here, for example, collared by a connecting flange F11) of the connecting nozzle 11 is adapted as directly evident from FIGS. 3*a*, 3*b* and 4 or their combination, furthermore, to be connected with a line end of a fluid line —, for example, a fluid line with a line end collared equally as the nozzle end 11+ by or with a connecting flange—to form a fluid line system (FIG. 3*b*, and FIG. 4), especially in such a manner that both the flow channel 10-I of the adapter 10 as well as also the flow channel 10-II of the adapter 10 communicate with a lumen of the fluid line, i.e. open into the lumen. Moreover, also the free nozzle end 12+ (for example, likewise collared by or with a connecting flange F12) of the connecting nozzle 12 is adapted to be connected with a line end of another fluid line, for example, a fluid line with a line end collared equally as the nozzle end 12+ by or with a connecting flange, and additionally also the free nozzle end 13+ (for example, likewise collared by or with a connecting flange F13) of the connecting nozzle 13 is adapted to be connected with a line end an additional fluid line, for example, a fluid line with a line end collared equally as the nozzle end 13+ by or with a connecting flange. The connection flanges used for forming the fluid line system, not least of all also the aforementioned connection flanges F11, F12, and F13 of the adapter 10, can be, for example, also standard connection flanges, such as e.g. standardized weld neck flanges, loose flanges or, for instance, screwed connections for dairy applications. The connecting nozzle 11, 12, 13 of the adapter 10 can additionally be so embodied and arranged that the adapter 10 has, for example, a T-shaped or, as well as also directly evident from FIGS. 1*a*, 1*b* and 2, for example, a Y-shaped outline.

The projection 14 of the adapter 10 is, especially, provided, and embodied, to be inserted into a lumen enveloped by a wall of the above-referenced fluid line to be connected at the free nozzle end 11+ to form two tubular chambers of the fluid line mutually separated by the projection 14 and adapted for guiding fluid flowing through; this, especially, in such a manner that —, as well as also schematically shown in FIG. 4, and directly evident from a combination of FIGS. 3*b* and 4—in the lumen of the fluid line both a tubular first chamber 100-I communicating with the flow channel 10-I of the adapter 10 as well as also a tubular second chamber 100-II communicating with the flow channel 10-II of the adapter 10 are formed. According to an additional embodiment of the invention, the projection 14 has a breadth b14, which is greater than a diameter of the first flow opening 10a and/or greater than a diameter of the second flow opening 10b. In another embodiment of the invention, a lateral surface 14a of the projection 14 is embodied at least in certain regions as a sealing surface. For example, in such case, also mutually spaced portions of the lateral surface 14a can be adapted to contact corresponding portions of the wall of the fluid line to be connected to the free nozzle end 11+, namely portions facing the lumen of the fluid line. Accordingly, the lateral surface 14a of the projection 14 includes according to an additional embodiment of the invention a first portion 14', which is adapted to contact a corresponding first portion of the wall of the aforementioned fluid line, and the lateral surface 14a of the projection 14 includes a second portion 14" remote from the first portion 14', especially an equally large second portion 14" and/or a second portion 14" lying opposite the first portion 14', which second portion 14" is adapted to contact a corresponding second portion of the wall of the fluid line remote from the first portion of the wall. The first portion 14' can, for example, have the same size as the second portion 14". Additionally, the two portions 14', 14" can, for example, also be so embodied that they extend parallel to one another and/or to an imaginary principal axis of inertia of the adapter 10. Moreover, a third portion 14''' of the lateral surface 14a extending between the aforementioned first portion 14' of the lateral surface 14a and the aforementioned second portion 14" of the lateral surface 14a can form an end face of the projection 14 defining the free end 14+ of the projection 14. In another embodiment of the invention, the projection 14 has an imaginary longitudinal axis extending from the free nozzle end 11+ to the projection end 14+—, for example, a longitudinal axis also parallel to or coincident with the aforementioned imaginary principal axis of inertia of the adapter 10. Projection 14 is axisymmetric to the longitudinal axis, for example, in order to be able to form by means of the adapter 10 the aforementioned flow chambers in a fluid line with a lumen rotationally symmetric relative to an imaginary longitudinal axis of the fluid line, for example, also a longitudinal axis corresponding to a push in direction of the adapter 10, and to the aforementioned principal axis of inertia —. Furthermore, the projection 14 as well as the connecting nozzles 11, 12, 13 can be so embodied and arranged that the adapter 10, as well as also directly evident from FIGS. 1a, 1b and 2, is symmetric at least relative to the principal axis of inertia.

In an additional embodiment of the invention, there is formed by means of the adapter 10 a fluid line system, which—such as, among others, also indicated, in each case, in FIGS. 3a, 3b, 4, 5, 6a, 6b and 7 to 12, or as directly evident from a combination of the figures— comprises besides the adapter 10 additionally a first fluid line 100. The fluid line system is, especially, also provided to be used for ascertaining measured values for at least one measured variable —, for example, a mass flow rate, a total mass flow, a volume flow rate, a total volume flow, a density, a viscosity or a temperature—of a fluid to be transferred, and to form a corresponding measuring system. The fluid to be transferred can be, for example, a liquid fuel, especially also a liquefied gas, such as, for instance, a liquefied gas containing methane and/or ethane and/or propane and/or butane and/or a liquefied natural gas (LNG); a fluid to be transferred by means of the fluid line system of the invention can, for example, however, also be a compressed gas, for instance, a compressed natural gas (CNG).

In an additional embodiment of the invention, the fluid line system is formed by connecting the adapter 10 with the fluid line 100, i.e. by connecting the fluid line 100 with its fluid line 100 with its line end 100+ two the adapter 10, especially namely to the free nozzle end 11+ of the connecting nozzle 11; this, especially, in such a manner that the projection 14 of the adapter 10 protrudes inwardly into the lumen of the fluid line 100. The fluid line 100 can, such as, among others, also indicated in FIGS. 6a, 6b, and 7, for example, also be an integral a component of a measuring device prefabricated before the connecting of the adapter 10, such as, for instance, a Coriolis mass flow-, or density measuring device with a vibronic measuring transducer having two or more (metal-)tubes connected for flow in parallel. For example, the fluid line 100 can be namely a distributor piece of such a measuring transducer capable of functioning nominally as a line branch or line junction.

The fluid line 100 of the fluid line system includes a lumen enveloped by a wall, for example, a wall of metal, for example, titanium, zirconium, a stainless steel or a nickel based alloy, which extends from an first flow opening 100a located in a first line end 100+ of the fluid line 100 both to a second flow opening 100b located in a second line end 100 # of the fluid line 100 as well as also to a third flow opening 100c spaced from the flow opening 100b and located likewise in the second line end 100 # of the fluid line 100, for example, also such that it is embodied essentially Y-shaped in the manner of a lumen of a collector piece or essentially T-shaped in the manner of a lumen of a T-piece. The wall of the fluid line 100 can be, for example, of the same material as that, of which the wall surrounding the first flow channel 10-I of the adapter 10 is at least partially, especially predominantly or completely, composed, or of which the wall surrounding the second flow channel 10-II of the adapter 10 is at least partially, especially predominantly or completely, composed. Furthermore, the fluid line 100 can, as well as also schematically shown in FIG. 4, or directly evident from a combination of FIGS. 4 and 6a, be embodied, at least in an region bordering on the line end 100+, as a rigid and/or tubular connecting nozzle, for example, in such a manner that the line end 100+, i.e. the flow opening 100a located there, is collared by or with a connecting flange, especially namely a connecting flange compatible with a connecting flange F11 provided, in given cases, on the adapter 10. In an additional embodiment of the invention, the flow opening 100a of the fluid line 100 has a diameter, which is somewhat greater than the above-referenced breadth b14 of the projection 14, and the breadth b14 of the projection 14 is so dimensioned that it is somewhat less than a caliber D100 of the fluid line 100. In another embodiment of the invention, the lumen of the fluid line 100 has, furthermore, a length 1100, measured as a shortest separation between the first line end 100+ and the second line end 100 #, which is so dimensioned that it, at most, equals the length 114 of the projection 14, or the adapter 10 and the fluid line 100 are so embodied that the length 114 of the projection amounts to no more than the length 1100.

Figure 5:
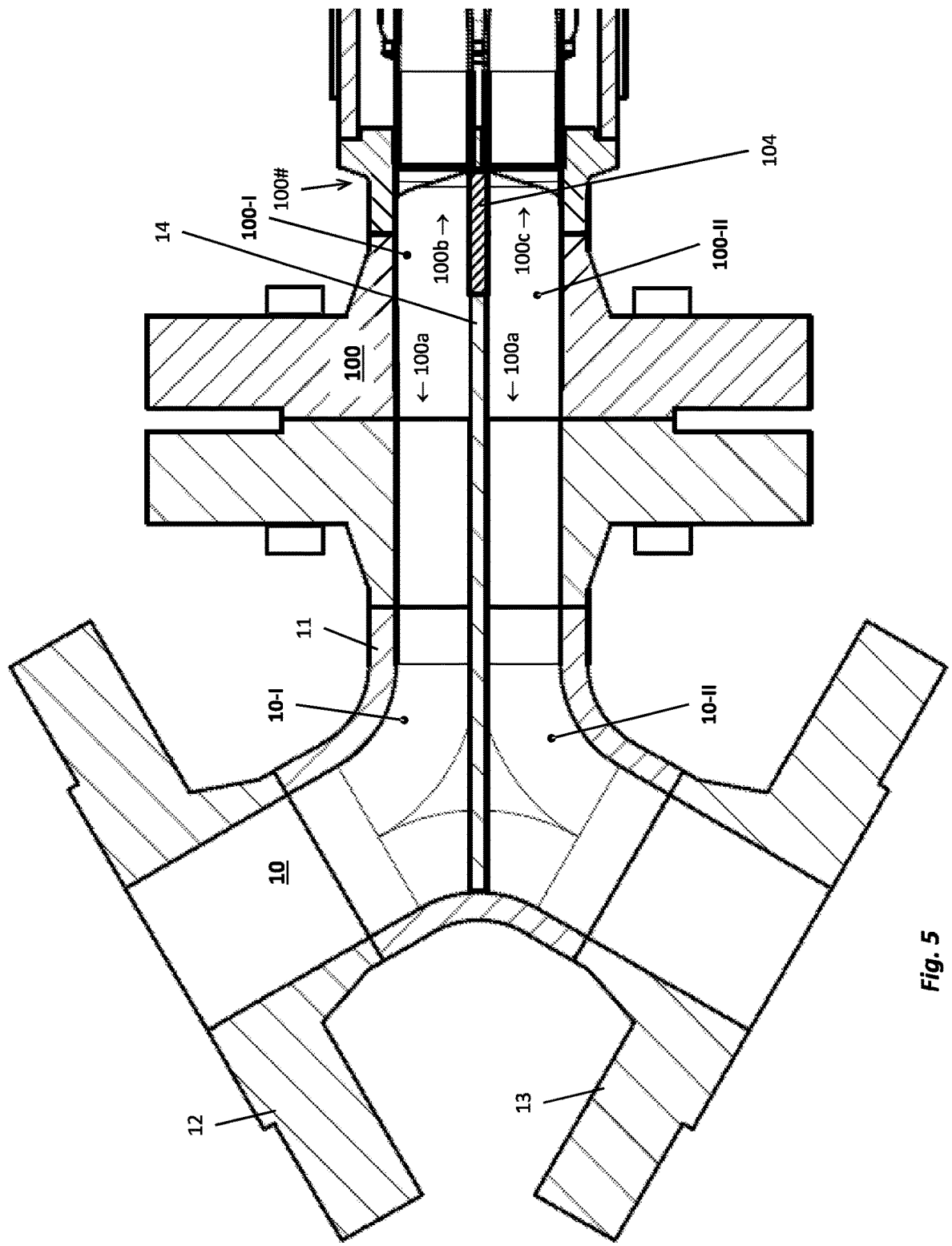
FIG. 5 shows a sectioned side view of another variant of the fluid line system of FIG. 3b.
Figure 6A:
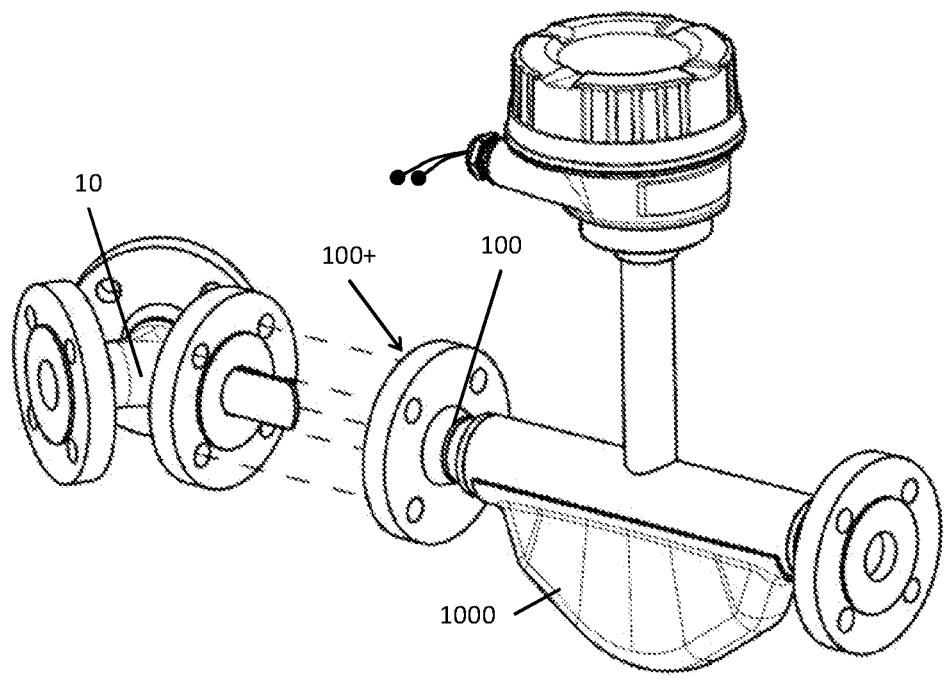
FIGS. 6a, and 6b show in different perspective side views an application of an adapter of FIGS. 1a and 1b for forming a fluid line system embodied, for example, as a measuring system for measuring at least one measured variable of a flowing fluid.
Figure 6B:
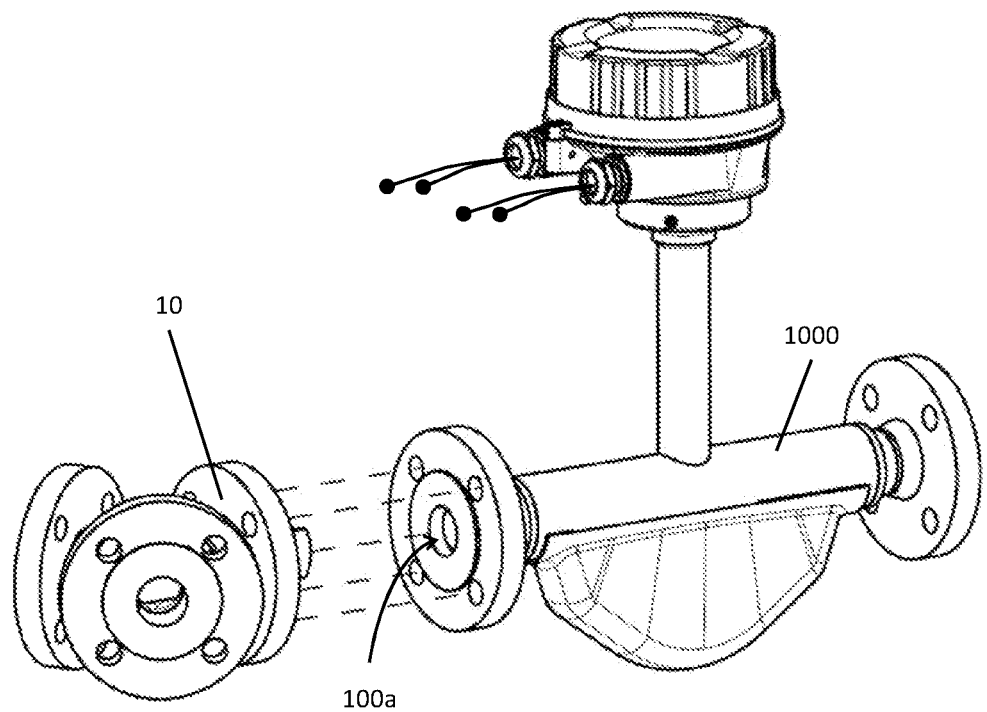
Figure 7B:
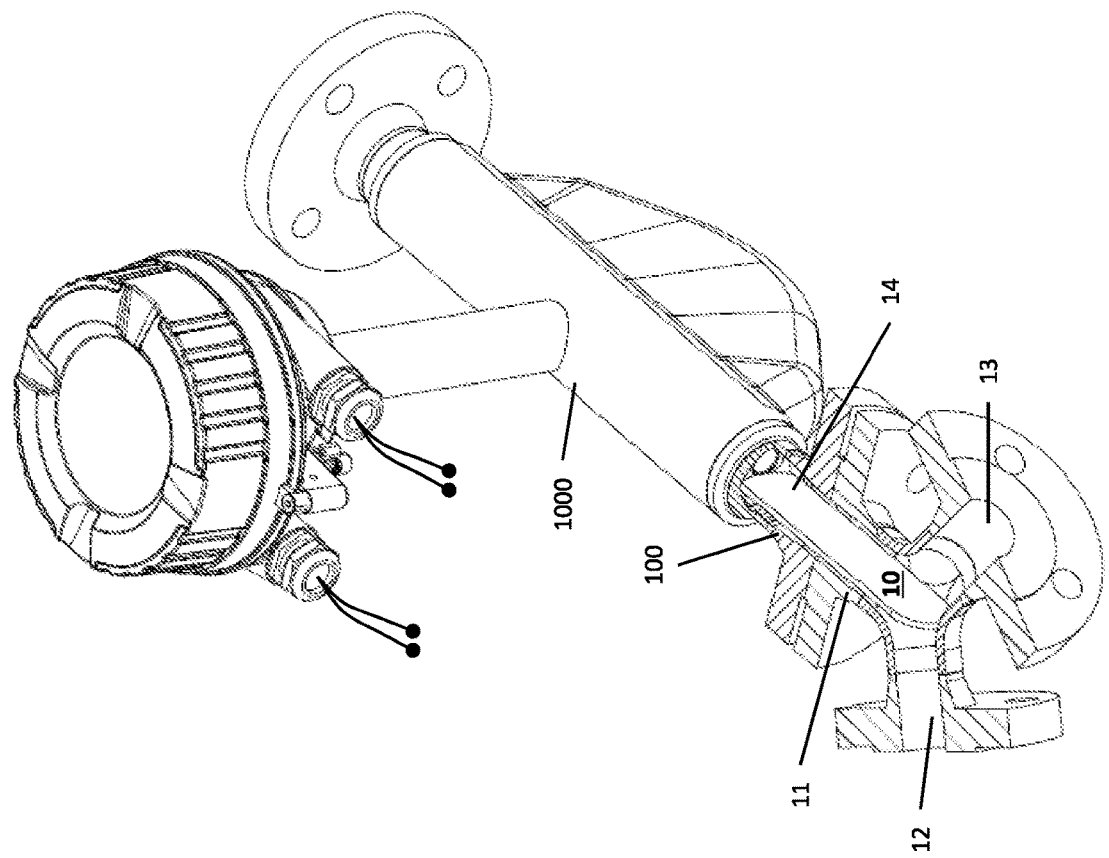
FIGS. 7a, and 7b show in perspective, partially sectioned outer views a fluid line system formed according to FIGS. 6a and 6b.
Figure 7A:
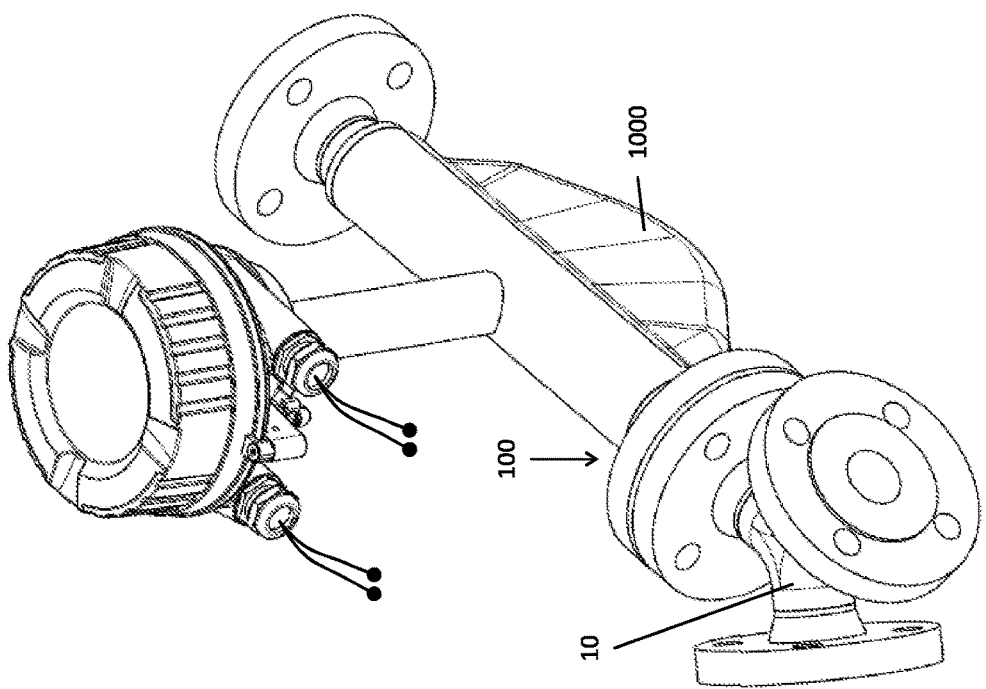
Figure 8:
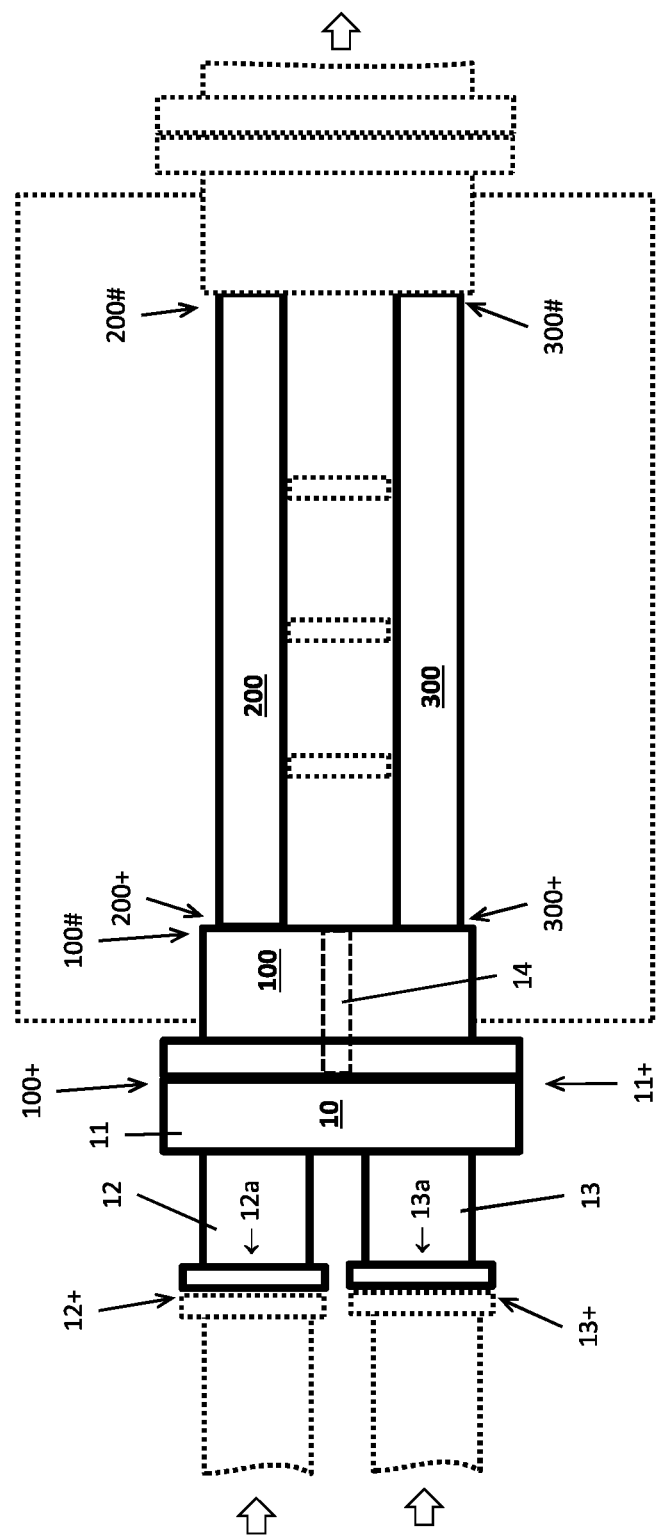
FIG. 8 shows schematically another variant of a fluid line system formed by means of an adapter of FIGS. 1*a* and 1*b*.
Figure 9:
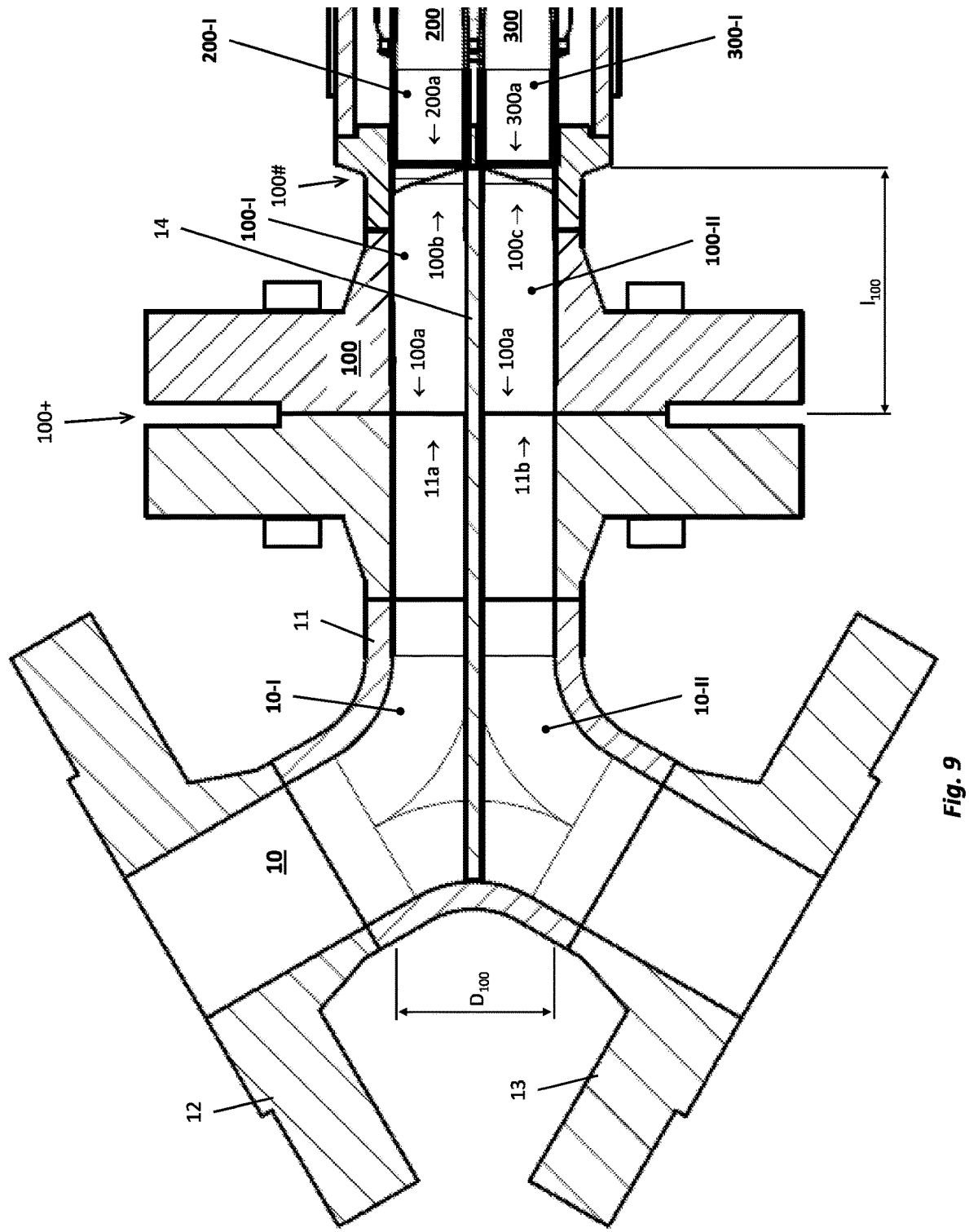
FIG. 9 shows a sectioned side view of a fluid line system of FIG. 8.

In an additional embodiment of the invention, the adapter is connected with the fluid line 100, in such a manner that—such as, among others, also shown schematically, in each case, in FIGS. 3b, 4, and 5—both the flow channel 10-I of the adapter 10 as well as also the flow channel 10-II of the adapter 10 open into the lumen of the fluid line 100, and the fluid line 100 with its line end 100+ is connected to the adapter 10 in such a manner that the projection 14 of the adapter 10 —, as well as also schematically shown, in each case, in FIGS. 3b, 4, and 5—protrudes inwardly into the lumen of the fluid line 100 to form two tubular chambers 100-I, 100-II of the fluid line 100 mutually separated by the projection and adapted, in each case, for guiding fluid flowing through. In an additional embodiment of the invention, the fluid line 100 with its line end 100+ is connected to the connecting nozzle 11 of the adapter 10 in such a manner that the projection 14 of the adapter 10 protrudes inwardly into the lumen of the fluid line 100 and that there are formed in the lumen of the fluid line 100 a tubular first chamber 100-I communicating with the flow channel 10-I of the adapter 10 as well as a tubular second chamber 1004I communicating with the flow channel 10-II of the adapter 10. In the example of an embodiment shown here, the flow channel 10-I of the adapter 10 opens via flow opening 11a of the connecting nozzle 11 into the chamber 100-I of the fluid line 100 and the flow channel 10-II of the adapter 10 opens via flow opening 11b of the connecting nozzle 11 into the chamber 100-II the fluid line 100, and the chamber 100-I communicates with the flow channel 10-I and the chamber 100-II communicates with the flow channel 10-II. In advantageous manner, the fluid line 100 with its line end 100+ can additionally be so connected to the connecting nozzle 11 of the adapter 10 that the so formed chambers 100-I, 100-II are equally large and/or that the so formed chambers 100-I, 100-II are mutually separated, for example, in such a manner that the chamber 100-I extends from the flow opening 11a of the connecting nozzle 11 to the flow opening 100b of the fluid line 100, equally as well not to the flow opening 11b of the connecting nozzle 11 and that the chamber 100-II extends from the flow opening 11b of the connecting nozzle 11 to the flow opening 100c of the fluid line 100, equally as well not to the flow opening 10a of the first connecting nozzle 11, and/or in such a manner that the chamber 100-I extends from the flow opening 11a of the connecting nozzle 11 to the flow opening 100b of the fluid line 100, equally as well not to the flow opening 100c of the fluid line 100 and that the chamber 1004I extends from the flow opening 11b of the connecting nozzle 11 to the flow opening 100c of the fluid line 100, equally as well not to the flow opening 100b of the fluid line 100. Accordingly, fluid line 100 and adapter 10 can be so embodied that in the case of a fluid line system formed therewith the flow channel 10-I of the adapter 10 does not open into the chamber 1004I of the fluid line 100, and that in the case of a fluid line system formed therewith the flow channel 10-II of the adapter 10 does not open into the chamber 100-I of the fluid line 100.

Particularly for the purpose of implementing mutually separated chambers 100-I, 100-II, the adapter 100 and the fluid line 100 are according to an additional embodiment of the invention, furthermore, so embodied that the lateral surface 14a (e.g. embodied at least in certain regions as a sealing surface) of the projection 14 of the adapter 10 can at least partially contact and does contact, the wall of the fluid line 100, especially to form a seal bounding or even impeding, or durably excluding, a through flowing fluid. For example, mutually spaced portions of the lateral surface 14a can be embodied to be able to contact, or to contact, a corresponding portion of the wall of the fluid line 100 facing the lumen of the fluid line 100. In an additional embodiment of the invention, the projection 14 of the adapter 10, has, consequently, furthermore, a contour, which, at least in certain regions, is —, for example, also predominantly or completely—complementary to a contour of the wall of the fluid line 100 corresponding to a longitudinal section of the fluid line 100; this, especially, in such a manner that the above-referenced first portion 14' of the lateral surface 14a of the projection 14 can contact, or contacts, a corresponding first portion of the wall of the fluid line 100 to form a seal limiting or impeding a flowing through of fluid. In another embodiment of the invention, it is additionally provided that the second portion 14" of the lateral surface 14 remote from the portion 14' can contact, or contacts, likewise a corresponding second portion of the wall of the fluid line 100, consequently a second portion remote from the aforementioned first portion of the wall to form a seal limiting or impeding a flowing through of fluid.

In an additional embodiment of the invention, it is, additionally, provided that the projection 14 of the adapter 10, with a portion 14' of the lateral surface 14a facing the second line end 100 # of the fluid line 100, can contact, or contacts, a portion of the wall located between the flow opening 100b and the flow opening 100c of the fluid line 100, facing the lumen of the fluid line 100, and formed, for example, as a sealing surface, for example, also to form a seal limiting or impeding a flowing through of fluid. Alternatively, the fluid line 100 can, such as described in, among others, the above referenced DE102014118367.3, respectively as shown in FIG. 5, for example, also have arranged within its lumen of a partition 104, which extends from a region located between the flow opening 100b and the flow opening 100c of the fluid line 100 with a length which is less than the length $I_{100}$ of the lumen of the fluid line 100, to a free intermediate wall end remote from the line end 100 # of the fluid line 100, and the fluid line and the adapter can additionally, for example, also be so embodied that the projection 14 of the adapter 10 can contact, or contacts, with the portion 14" of the lateral surface 14a a corresponding end face of the partition 104 forming the intermediate wall end to form a seal limiting or impeding a flowing through of fluid. The partition 104 can be embodied essentially plate-shaped and/or disk like, and have a breadth, which equals the aforementioned caliber $D_{100}$ of the fluid line 100, or equals the aforementioned diameter of the flow opening 100a. With application of such a partition, the sealing surfaces provided for forming the aforementioned seal between the two chambers 100-I, 100-II of the fluid line 100 can have a comparatively simple geometry, which can, for example, thus also be embodied exactly as the sealing surface formed by the portion 14'''; this being true also for the case, in which the portion of the wall of the fluid line 100 located between the flow openings 100b, 100c is not straight, but, for example, curved.

By application of the adapter 10 of the invention in connection with the fluid line 100, an opportunity is presented, in very simple manner, also for the already mentioned case, in which the fluid line 100 is provided nominally as a line branching, to provide a fluid line system, in the case of which, as well as also indicated in FIG. 3b, to guide two mutually independent fluid streams, firstly, through the adapter 10, further through the chambers 100-I, 100-II formed in the fluid line 100 and further through the flow opening 100b, respectively the flow opening 100c into, in each case, an appropriate one of two additional fluid lines connected thereto. Equally, also for the reversed case, in which the fluid line 100 is provided nominally as a line junction, a fluid line system of the aforementioned type can be adapted in such a manner that two mutually independent fluid streams can be guided, firstly, through, in each case, one of two additional fluid lines connected to the fluid line 100, further through the flow opening 100b, or the flow opening 100c, to the chambers 100-I, 100-II formed in the fluid line 100 and thereafter through the adapter 10. In an additional embodiment of the invention, the fluid line system formed by means of the adapter 100 and the fluid line 100 accordingly comprises, furthermore, a second fluid line 200—, for example, a second fluid line 200 embodied as a rigid and/or at least sectionally circularly cylindrical tube—with a lumen 200-I enveloped by a wall and extending from a first flow opening 200a located in a first line end 200+ of the fluid line 200 to a second flow opening 200b located in a second line end 200 # of the fluid line 200, and comprises the fluid line system at least a third fluid line 300 —, for example, a third fluid line 300 embodied as a rigid and/or at least sectionally circularly cylindrical tube and/or constructed equally fluid line 200—with a lumen 300-I enveloped by a wall and extending from an first flow opening 300a located in a first line end 300+ of the third fluid line 300 to a second flow opening 300b located in a second line end 300 # of the fluid line 300. The wall of the fluid line 200, as well as also the wall of the fluid line 300 can be composed, for example, of metal, for example, titanium, zirconium, a stainless steel, or a nickel based alloy, respectively of the same material as the wall of the fluid line 100, or the projection 14. As, among others, also evident in FIGS. 8 and 9, individually or in combination, in such case, both the fluid line 200 with its line end 200+ as well as also the fluid line 300 with its line end 300+ are connected—durably, fixedly and leakage freely —, in each case, with the line end 100 # of the fluid line 100, so that both the lumen 200-I of the fluid line 200 as well as also the lumen 300-I of the fluid line 300 communicate with the lumen of the fluid line 100; this e.g. in such a manner that the flow opening 200a of the fluid line 200 opens into the flow opening 100b of the fluid line 100 and the flow opening 300a of the fluid line 300 opens the into the flow opening 100c of the fluid line 100, respectively that the lumen 200-I of the fluid line 200 opens via flow opening 100b into the chamber 100-I of the fluid line 100 and the lumen 300-I of the fluid line 300 opens via flow opening 100c into the chamber 100-II of the fluid line 100 and. Furthermore, the adapter 10 and the fluid lines 100, 200 and 300 can be so embodied and arranged that the flow channel 10-I of the adapter 10 communicates via chamber 100-I with the lumen 200-I and the flow channel 10-II of the adapter 10 communicates via chamber 100-II with the lumen 300-I. In an additional embodiment of the invention, the flow opening 200a of the fluid line 200 has, such as, among others, also directly evident from a combination of FIGS. 7 and 8, a diameter, which is less than the breadth b14 of the projection 14, and/or the flow opening 300a of the fluid line 300 has a diameter, which is less than the breadth b14 of the projection 14, and the adapter 10 and the fluid lines 200, 300 are so dimensioned that a caliber D200 of the fluid line 200 and/or a caliber D300 of the fluid line 300 are less than the breadth b14 of the projection 14.

Particularly for the mentioned case, in which the fluid line system is embodied as a component of a measuring system, the fluid line system can, as well as also shown in FIGS. 6a, 6b, 7a, and 7b, in each case, include, furthermore, a protective housing 1000 for the fluid lines 200, 300. The protective housing 1000 includes, encased by a wall, a cavity, within which the fluid line 200 and at least the fluid line 300 are located. Particularly for the purpose of providing a sufficiently twist- and bending-stiff, respectively impact- and pressure resistant, protective housing, its wall can, for example, be embodied of a metal, for instance, a stainless steel, and/or be at least partially of hollow cylindrical form. As directly evident in FIGS. 6a, 6b, 7a, and 7b or their combination, additionally a first housing end 1000+ of the protective housing 1000 can be formed by means of the fluid line 100, for instance, in such a manner that the fluid line 100 is an integral a component of the protective housing and/or that the protective housing 1000 has laterally limiting the aforementioned cavity a side wall, which is laterally affixed on the fluid line 100, or connected with such by material bonding.

Figure 10:
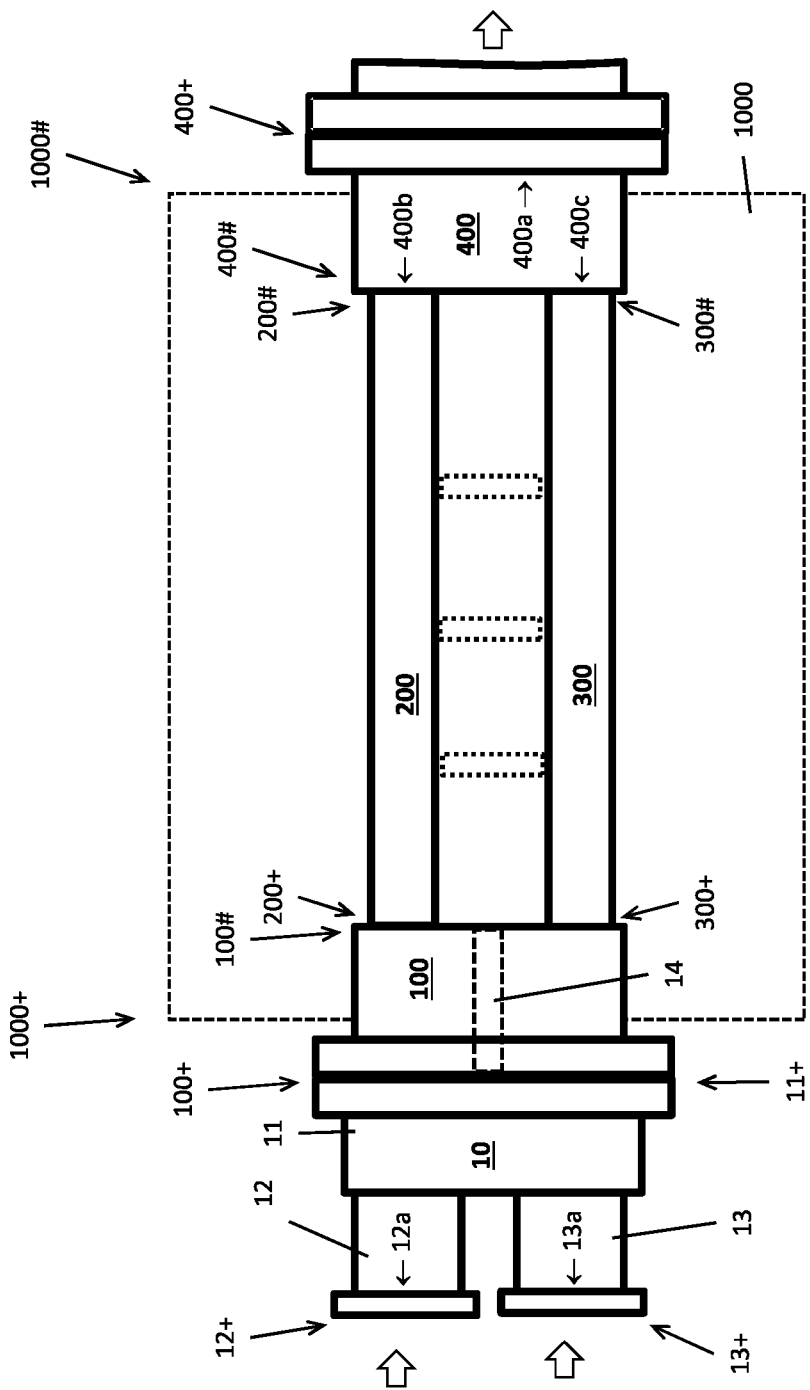
FIGS. 10 and 11 show schematically other variants of a fluid line system formed by means of an adapter of FIGS. 1*a* and 1*b*.

In an additional embodiment of the invention, the fluid line system includes, such as shown, among others, in FIG. 10, furthermore, for example, (nominally) serving as a line junction, a fourth fluid line 400 having a lumen enveloped by a wall and extending from a first flow opening 400a located in a first line end 400+ of the fluid line 400 both to a second flow opening 400b located in a second line end 400 # of the fluid line 400 as well as also to a third flow opening 400c located spaced from the flow opening 400b in the line end 400 #. The lumen can, for example, be embodied essentially Y-shaped in the manner of a lumen of a collector piece or essentially T-shaped in the manner of a lumen of a T-piece. The fluid line 400 can also be embodied as a connecting nozzle, respectively the line end 400+ of the fluid line 400 can be collared by or with a connecting flange, for example, a connecting flange compatible with the aforementioned connecting flange F11 of the adapter 10. Alternatively or supplementally, the wall of the fluid line 400 can be composed of a metal, for example, titanium, zirconium, a stainless steel or a nickel based alloy and/or the walls of the fluid lines 100, 400 can be of the same material. In advantageous manner, the fluid lines 100, 400 can additionally also be embodied of equal construction. The fluid line 400 is, furthermore, connected with the fluid lines 200, 300. In an additional embodiment of the invention, both the fluid line 200 with its line end 200 # as well as also the fluid line 300 with its line end 300 # are, in each case, connected—durably, fixedly and leakage freely—with the line end 400 # of the fluid line 400; this, especially, in such a manner that, as well as also shown in FIG. 10, both the lumen 200-I of the fluid line 200 as well as also the lumen 300-I of the fluid line 300, in each case, communicate with the lumen of the fluid line 400 and/or such that the flow opening 200b of the fluid line 200 opens into the flow opening 400b of the fluid line 400 and the flow opening 300b of the fluid line 300 opens into the flow opening 400c of the fluid line 400. For the aforementioned case, in which the fluid line system has a protective housing 1000, and its first housing end 1000+ is formed by means of the fluid line 100, additionally, also a second housing end 1000 # of the protective housing 1000 can be formed by means of the fluid line 400, for example, also such that both the fluid line 100 as well as also the fluid line 400, in each case, are integral components of the protective housing, and that the protective housing 1000 has a side wall laterally limiting the cavity, which is affixed or connected by material bonding laterally both to the fluid line 100 as well as also to the fluid line 400.

Figure 11:
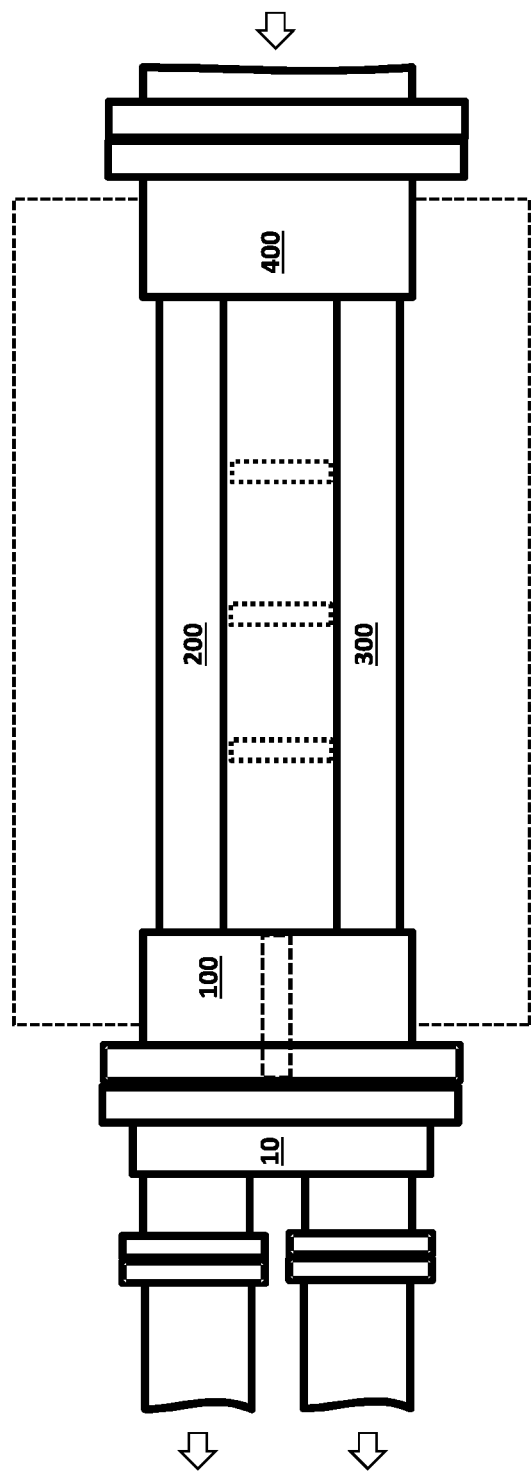
Figure 12:
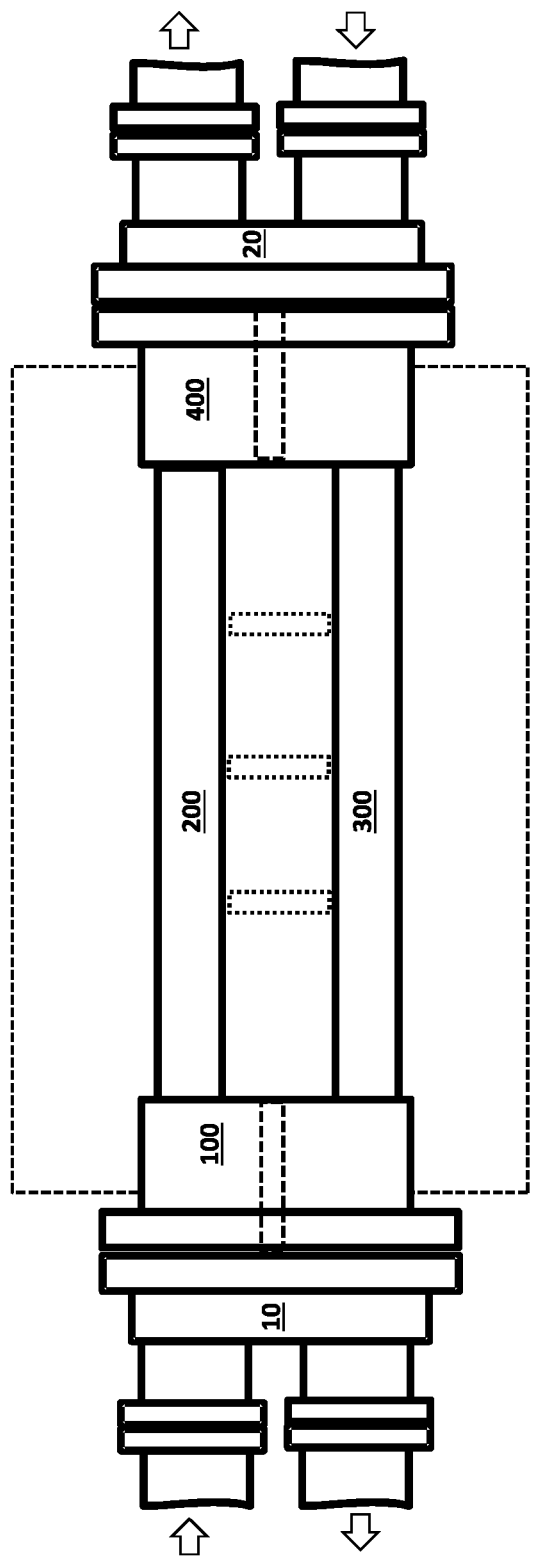
FIG. 12 shows schematically another variant of a fluid line system formed by means of two adapters of FIGS. 1*a* and 1*b*.
Figure 13:
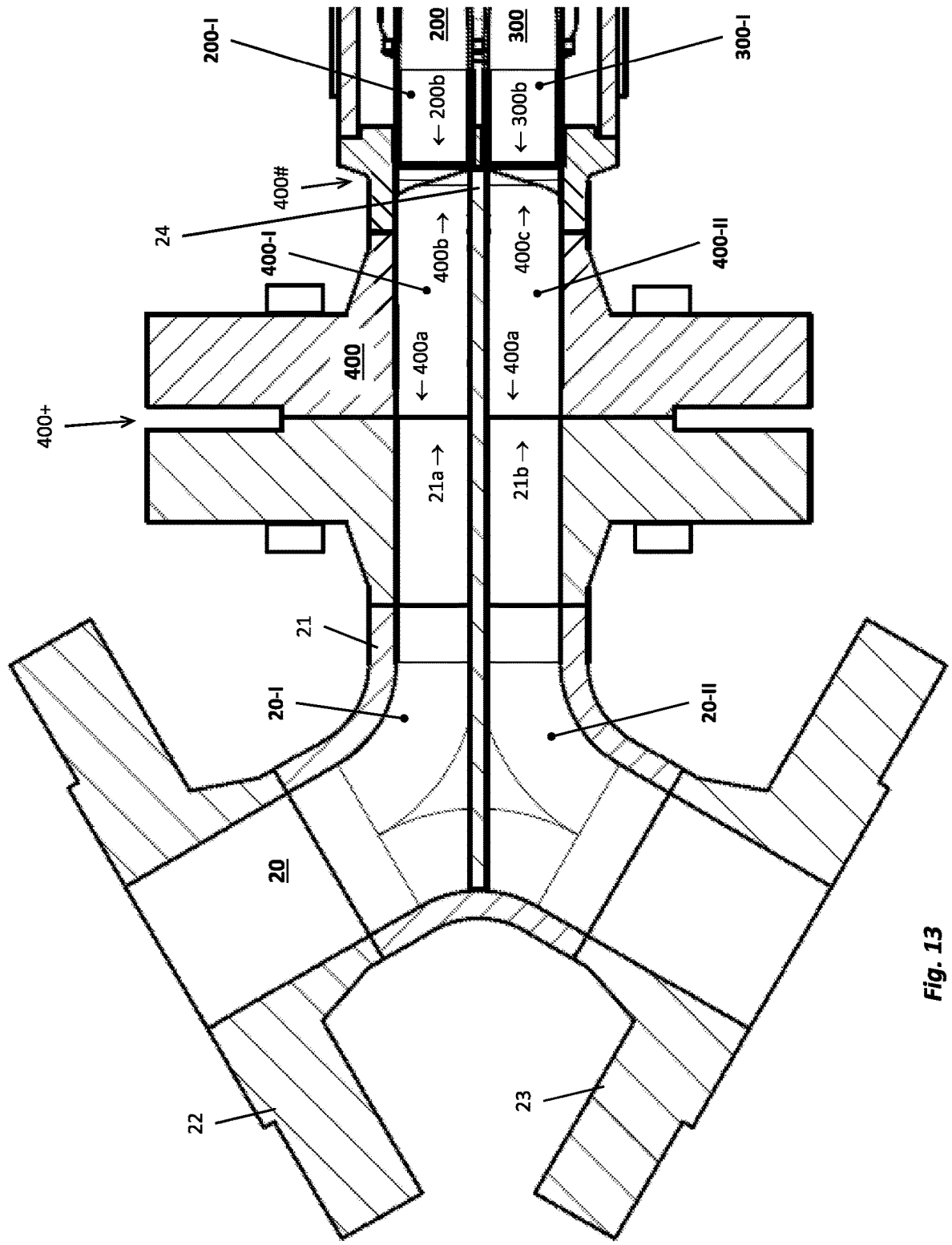
FIG. 13 shows a sectioned side view of a portion of a fluid line system of FIG. 12.

Depending on application of the fluid line system, e.g. depending on flow direction of the fluid guided therein, the fluid line 400 can function, such as, among others, also indicated in FIG. 10, for example, as a line junction, for instance, for the purpose of forming a fluid line system according to the above mentioned international patent application PCT/EP2015/070020; the fluid line 400 can, such as, among others, also indicated in FIG. 11, however, for example, also function as a line branch, for instance, in the case of application of the fluid line system in one of the configurations, or applications, referenced in the above mentioned WO-A 2006/091199, and WO-A 2008/013545. With application of an additional adapter of the invention —, for example, also an adapter constructed equally the adapter 10 —, a conventional measuring transducers of the aforementioned type, namely a measuring transducer formed by means of the fluid lines 100, 200, 300 and 400, can additionally also be used for forming a measuring system such as described in US-A 2006/0016273 or US-A 2007/0095152. Accordingly, a fluid line system of the invention can, as well as also shown in FIGS. 12 and 13, further comprise, supplementally to the aforementioned adapter 10, an additional adapter 20 connected with the fluid line 400, for example, an additional adapter 20 constructed equally to the adapter 10. Adapter 20 and fluid line 400 can, as shown in FIG. 13, and also directly evident from a combination of FIGS. 9 and 13, be positioned relative to one another and connected together in equal manner as in the case of adapter 10 and fluid line 100 for the purpose of forming two flow chambers 400-I, 400-II of the fluid line 400, of which a first flow chamber 400-I communicates with the lumen 200-I of the fluid line 200 and a second flow chamber 400-II communicates with the lumen 300-I of the fluid line 300.

Figure 14:
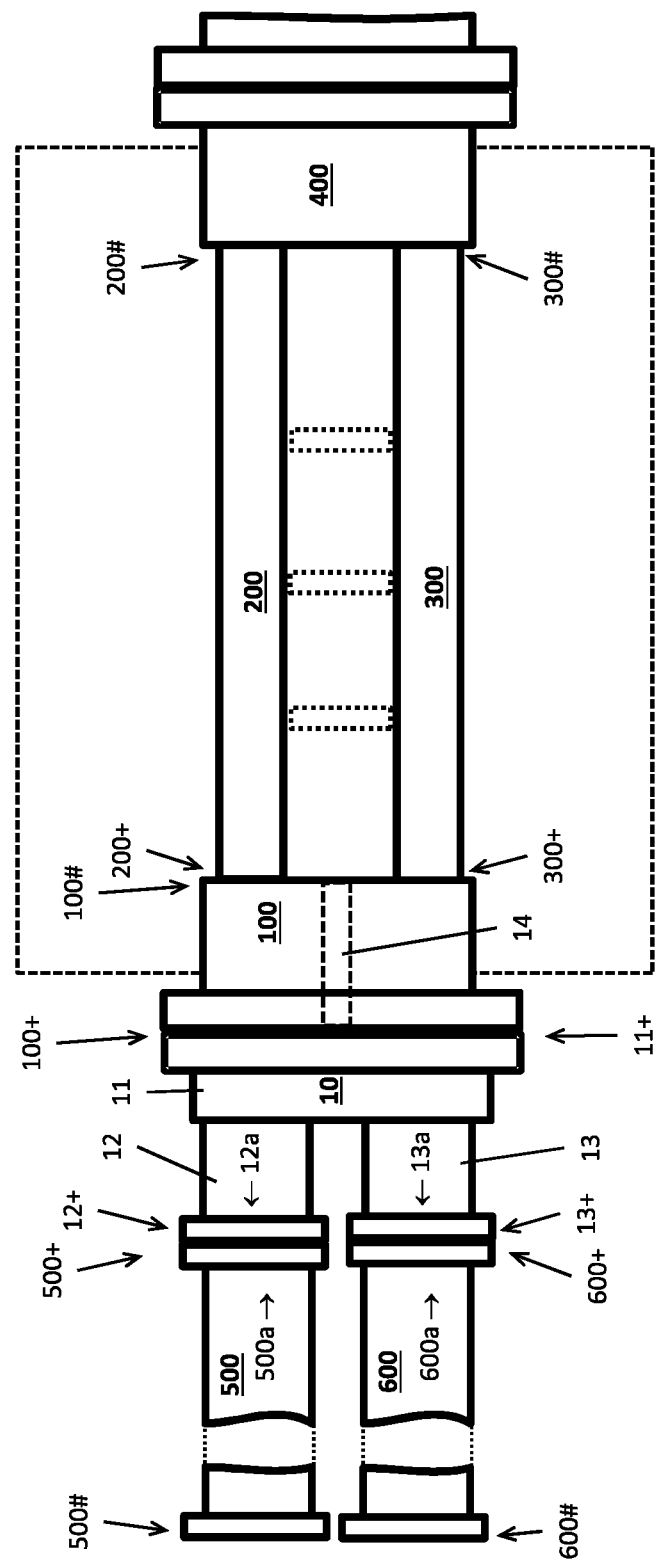
FIG. 14 shows schematically another variant of a fluid line system of FIG. 10.

In an additional embodiment of the invention, it is, additionally, provided that the fluid line system has a fifth fluid line 500 with a lumen enveloped by a wall and extending from a first flow opening 500a located in a first line end 500+ of the fluid line 500 to a second flow opening 500b located in a second line end 500 # of the fluid line 500 as well as a sixth fluid line 600 with a lumen enveloped by a wall and extending from a first flow opening 600a located in a first line end 600+ of the fluid line 600 to a second flow opening 600b located in a second line end 600 # of the fluid line 600. Each of the two aforementioned fluid lines 500, 600 can, for example, be embodied as a rigid and/or circularly cylindrical tube, and be formed by means of a wall of a metal, for example, a stainless steel, or a nickel based alloy. Moreover, the fluid lines 500, 600 can, for example, also be components of a dispensing system according to the above mentioned WO-A 2006/091199, and WO-A 2008/013545 or even components of a control device of one of the fluid line systems shown in the aforementioned PCT/EP2015/070020, or be components such components, for example, be a connection of a valve, or a connection of a T-piece. As also shown schematically in FIG. 14, additionally both the fluid line 500 as well as also the fluid line 600 are, in each case, connected with the adapter 10, for instance, in such a manner that—such as here presented—the flow channel 10-I of the adapter 10 communicates with the lumen of the fluid line 500 and the flow channel 10-II of the adapter 10 communicates with the lumen of the fluid line 600 and the fluid line 500 is connected with its line end 500+ two the free nozzle end 12+ of the connecting nozzle 12 and the fluid line 600 is connected with its line end 600+ two the free nozzle end 13+ of the connecting nozzle 13. For connecting the fluid line 500 and the fluid line 600 to the adapter 10, the line end 500+ and/or the line end 600+ can, as well as also shown in FIGS. 14, additionally, be collared, in each case, by or with a connecting flange, for example, a connecting flange compatible with the aforementioned connecting flange F12, or F13, as the case may be, of the adapter 10.

The fluid line system of the invention can, such as already indicated above, be, among others, also a component of a measuring system serving for measuring at least one measured variable—such as e.g. a density, a viscosity, a flow parameter, such as, for instance, a mass flow rate or a volume flow rate, and/or a temperature—of a flowing fluid, or comprise such a measuring system. The measuring system, in turn, can be, for example, a conventional Coriolis mass flow measuring device formed by means of a vibronic measuring transducer —, for example, also a vibronic measuring transducer serving for generating a mass flow rate of the flowing fluid dependent Coriolis forces —, for instance, a transducer according to one of the aforementioned patents or patent applications EP-A 816 807, US-A 2001/0037690, US-A 2008/0184816, U.S. Pat. Nos. 4,823,613, 5,602,345, 5,796,011, US-A 2011/0146416, US-A 2011/0265580, US-A 2012/0192658, WO-A 90/15310, WO-A 00/08423, WO-A 2006/107297, WO-A 2006/118557, WO-A 2008/059262, WO-A 2009/048457, WO-A 2009/078880, WO-A 2009/120223, WO-A 2009/123632, WO-A 2010/059157, WO-A 2013/006171 or WO-A 2013/070191 or even according to applicant's unpublished German patent application DE102014118367.3, or a measuring device formed by means of such a vibronic measuring transducer. In the case of such a fluid line system, it can additionally concern, for example, also a transfer point for traffic in goods where calibration is obligatory, such as e.g. a dispensing system for fuels, or a transfer point according to the above mentioned international patent application PCT/EP2015/070020. In an additional embodiment of the invention, it is, consequently, provided that at least one of the fluid lines 200, 300 is a component of a measuring transducer serving for generating at least one measurement signal corresponding to the aforementioned at least one measured variable, for example, a vibronic measuring transducer or a magneto-inductive measuring transducer; this, for example, also in such a manner that both the fluid line 200 as well as also the fluid line 300 are components of a measuring transducer, even one and the same measuring transducer. Alternatively or supplementally, it is, additionally, provided that the fluid line 100 is a component of a measuring transducer of the aforementioned type. In another embodiment of the invention, both the fluid line 100 as well as also the two fluid lines 200, 300 are, in each case, embodied as a component of one and the same measuring transducer. The fluid line 100 can accordingly, for example, also be formed by means of a distributor piece of such a measuring transducer, not least of all by means of a distributor piece of a vibronic measuring transducer and/or a measuring transducer of a Coriolis mass flow measuring device, or such a distributor piece can be formed by means of the fluid line 100. The distributor piece can, for example, nominally be adapted as a line branching the aforementioned measuring transducer serving for dividing a supplied fluid flow into two parallel flow portions; the distributor piece can, however, also a nominally be adapted as a line junction of the aforementioned measuring transducer serving for joining two parallel fluid streams to a total flow. Moreover, also the above-referenced fluid line 400 can be a component of the same measuring transducer, for example, be formed by means of an additional distributor piece of the measuring transducer, the—complementarily to the other distributor piece—is adapted as a line junction serving for joining two parallel fluid streams to a total flow, or as a line branching serving for dividing a supplied fluid flow into two parallel flow portions.

Figure 15:
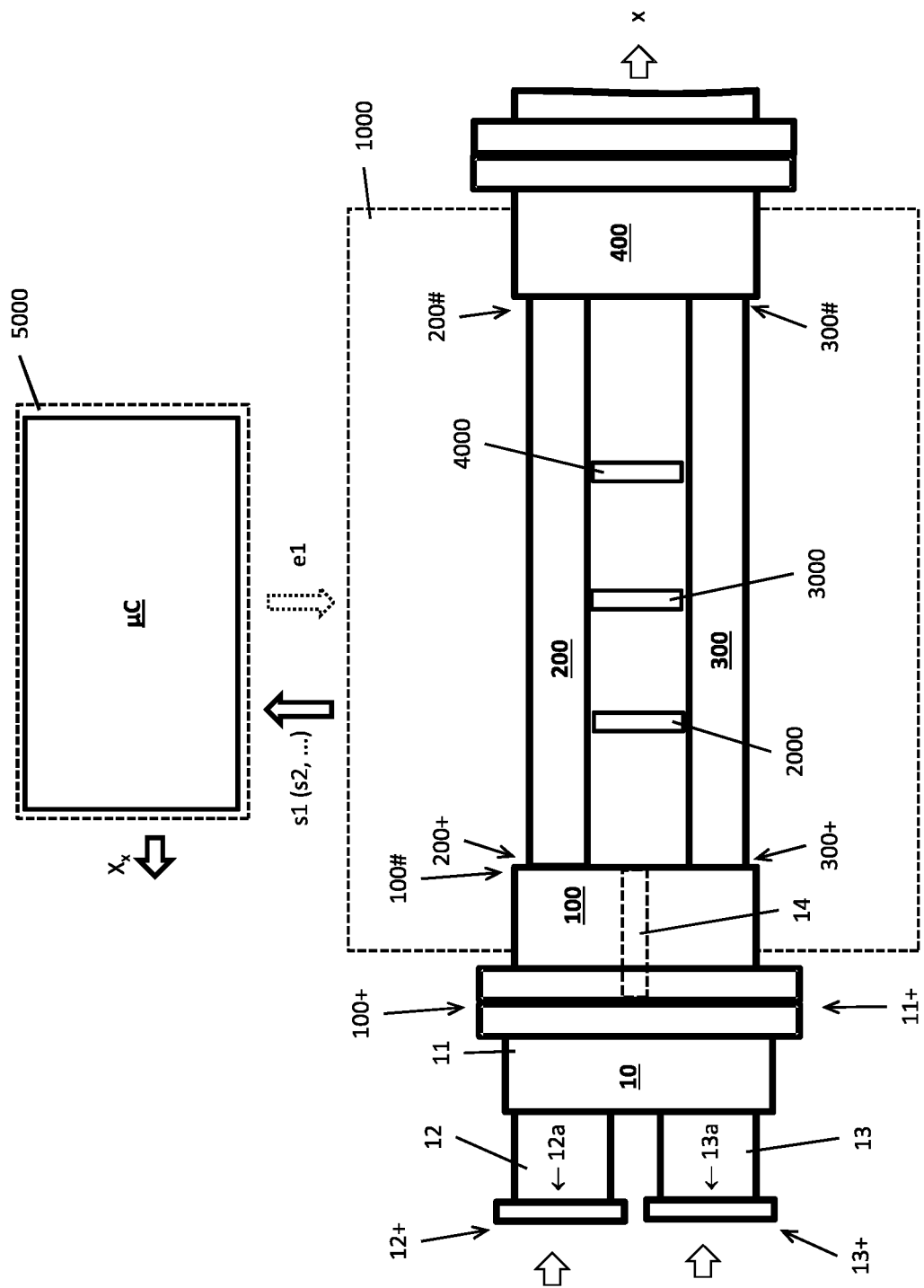
FIG. 15 shows schematically a fluid line system formed by means of an adapter of FIGS. 1*a* and 1*b* and capable of functioning as a measuring system.
Figure 16B:
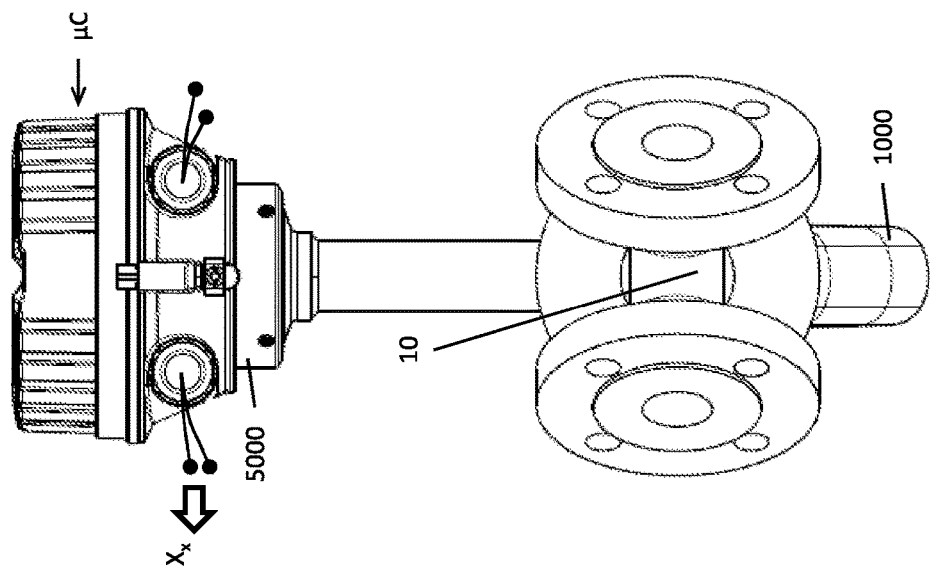
FIGS. 16*a*, and 16*b* show in additional different perspective, external views a variant of a fluid line system of FIG. 15.
Figure 16A:
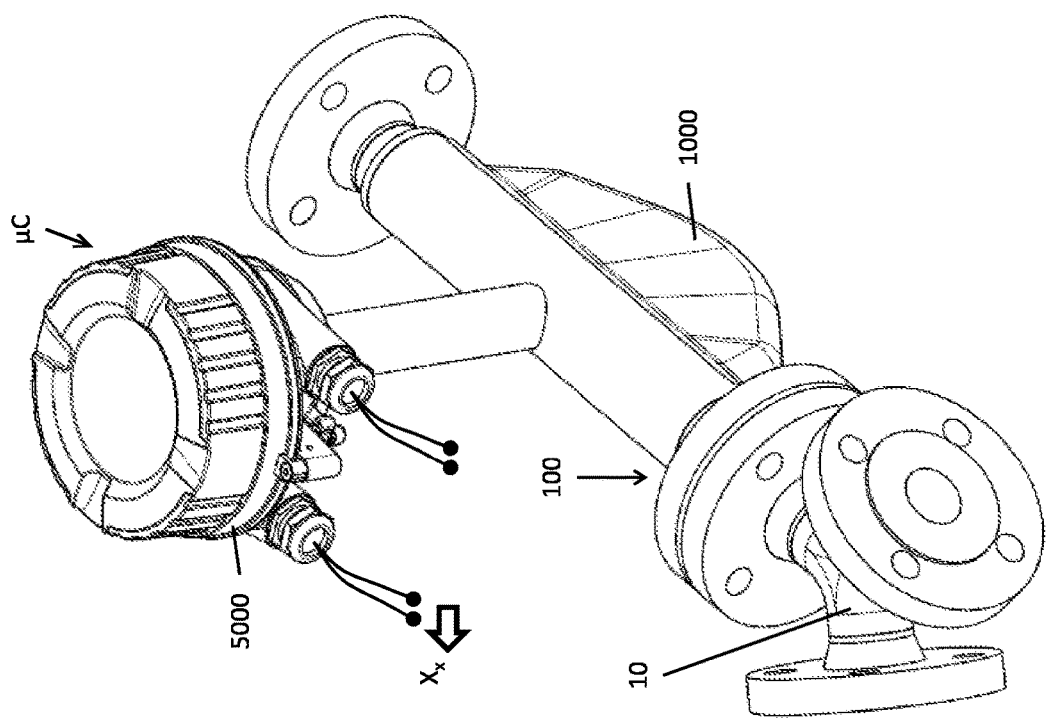
Figure 17:
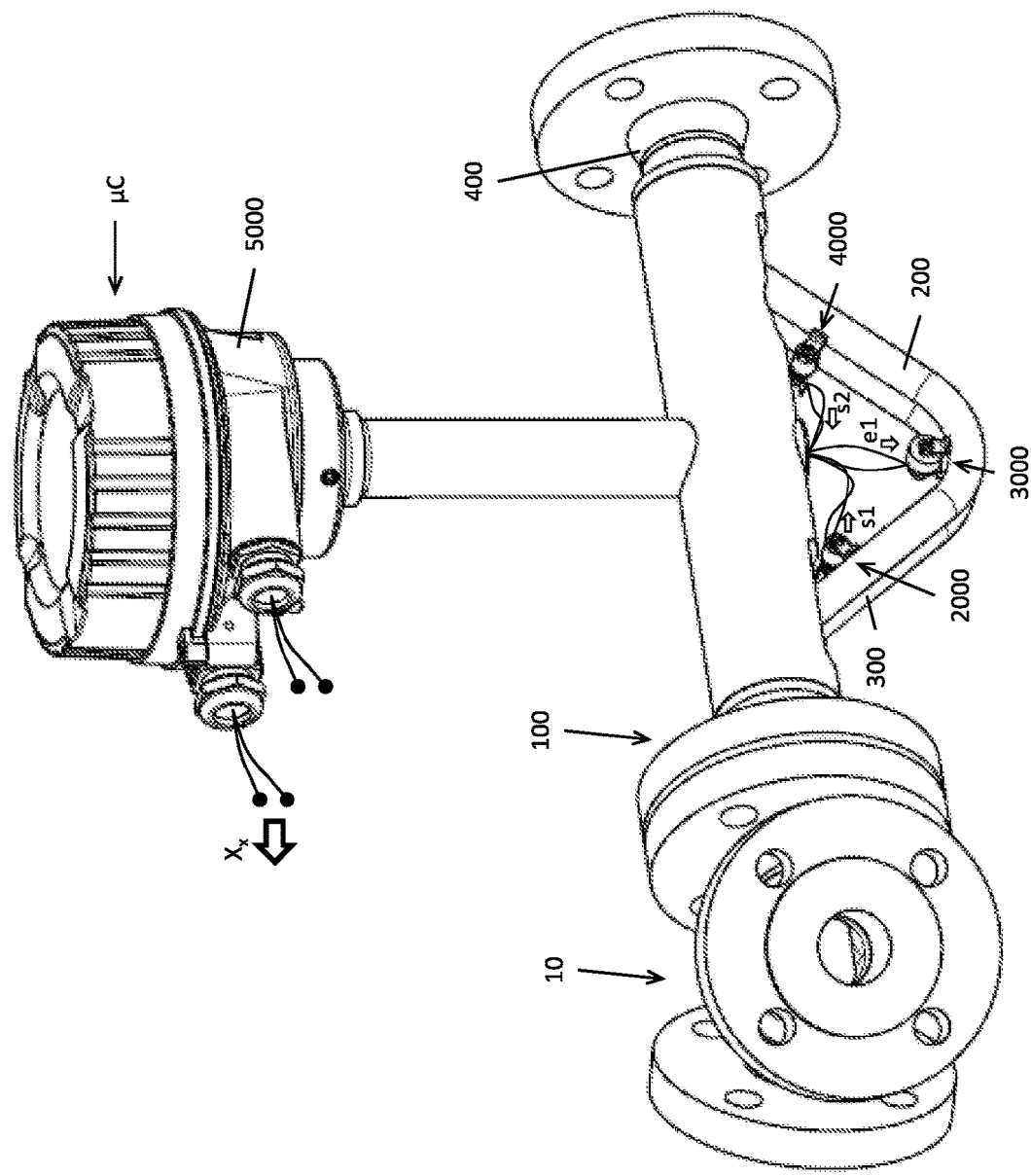
FIG. 17 shows in a perspective view a fluid line system formed by means of an adapter of FIGS. 1*a* and 1*b*, as well as by means of a measuring transducer, for example, a vibronic measuring transducer.

Accordingly, the fluid line system includes, as well as also schematically shown in FIG. 15, according to an additional embodiment of the invention, at least a first sensor 2000 for producing at least a first measurement signal s1 especially an electrical, analog, first measurement signal—corresponding to a measured variable x of a fluid guided in the fluid line system, namely a first measurement signal having at least one signal parameter dependent on the measured variable. The at least one measured variable x can be, such as already mentioned, for example, a density, a viscosity or a temperature of the fluid, which, in given cases, is flowing. The measured variable x can, however, also be, for example, a flow parameter, such as, for instance, a mass flow rate or a volume flow rate. Serving as a measurement signal parameter dependent on the measured variable, in turn, can be, for example, a signal level dependent on the at least one measured variable, a signal frequency dependent on the measured variable and/or a phase angle dependent on the measured variable. The sensor 2000 can, as indicated in FIG. 15, be located removed from the fluid lines 200, 300, equally as well in the proximity of the fluid line 200 and/or in the proximity of the fluid line 300, for example, also in such a manner that the sensor 2000, as well as also shown in FIGS. 17, is placed at least on the fluid line 200.

For the already mentioned case, in which the fluid line 200 is a component of a vibronic measuring transducer, according to an additional embodiment of the invention, at least the fluid line 200 is adapted to be flowed through by fluid and, during that, to be caused to vibrate. Moreover, also the fluid line 300 can be adapted, for example, for the case, in which both the fluid line 200 as well as also the fluid line 300 are components of the aforementioned, vibronic measuring transducer, to be flowed through by fluid and, during that, to be caused to vibrate; this, for example, also in such a manner that the two fluid lines 200, 300 are simultaneously flowed through by fluid and/or, simultaneously, to be caused to vibrate, especially opposite-equally. Accordingly, the fluid line system, according to an additional embodiment of the invention, can, furthermore, comprise at least one, especially electromechanical, or electrodynamic, oscillation exciter 3000 for exciting, and maintaining, mechanical oscillations, for example, bending oscillations, at least of the fluid line 200, or for exciting and/or maintaining mechanical oscillations of both the fluid line 200 as well as also the fluid line 300. Furthermore, it in the aforementioned case the sensor 2000 can be an oscillation sensor, for example, and electrodynamic oscillation sensor and/or an oscillation sensor differentially registering oscillatory movements of the two fluid lines 200, 300. Particularly for the mentioned case, in which the fluid line system is provided to measure mass flow rate based on Coriolis forces generated in the flowing fluid, the fluid line system can supplementally to the mentioned sensor 2000 have additionally also at least a second sensor 4000 for producing at least a second measurement signal s2—especially an electrical and/or analog signal— corresponding to the measured variable. The sensor 4000 can be of equal construction to that of the sensor 1000 and/or and be positioned with the same separation as the sensor 1000 from the fluid line 200, or from the fluid lines 200, 300. Alternatively or supplementally, the sensors 2000, 4000 can be positioned symmetrically relative to the oscillation exciter 3000, for example, also in such a manner that, as indicated in FIG. 15 and such as quite usual in the case of vibronic measuring transducers of the aforementioned type, the second sensor 4000 is farther from the fluid line 100 than the first sensor 2000.

For the purpose of processing, or evaluation, of the at least one measurement signal s1, the fluid line system can include, furthermore, a measuring- and operating electronics µC electrically coupled with the sensor 2000, or the sensors 2000, 4000, as the case may be, and formed, for example, by means of at least one microprocessor and/or digital signal processor (DSP), which —, as well as also shown in FIGS. 15, 16a, 16b, and 17, in each case, or such as directly evident from their combination—can be accommodated in advantageous manner, in turn, in a sufficiently dust- and water-tight, impact- and explosion resistant, protective housing 5000. Especially, the measuring- and operating electronics µC can, furthermore, be adapted to process the at least one measurement signal s1, or the measurement signals s1, s2, as the case may be, especially namely to ascertain by means of the first measurement signal measured values Xx for the at least one measured variable x. For the aforementioned case, in which the fluid line system is adapted with at least one oscillation exciter, the measuring- and operating electronics µC can additionally be electrically coupled with the oscillation exciter. In an additional embodiment of the invention, the measuring- and operating electronics µC is, furthermore, adapted to supply an electrical exciter signal el to the aforementioned oscillation exciter 3000, and the oscillation exciter 3000 is additionally adapted to convert electrical power supplied by means of the exciter signal el into mechanical oscillations of at least the fluid line 200, especially mechanical power effecting mechanical oscillations of both the fluid line 200 as well as also the fluid line 300.

The invention claimed is:

1. A fluid line system, comprising:
a first fluid line having a lumen enveloped by a wall and extending from a first flow opening in a first line end of the first fluid line to a second flow opening in a second line end of the first fluid line and to a third flow opening spaced from the second flow opening in the second line end of the first fluid line; and
an adapter for connecting fluid lines serving for guiding a flowing fluid, the adapter including:
a first connecting nozzle having a free nozzle end adapted to connect with the first fluid line, wherein the first connecting nozzle has in the free nozzle end a first flow opening and a second flow opening;
a second connecting nozzle having a free nozzle end adapted to connect with a second fluid line;
a third connecting nozzle having a free nozzle end adapted to connect with a third fluid line;
two mutually separated, tubular, flow channels adapted, in each case, for guiding fluid flowing in and then out, the two flow channels including:
a first flow channel extending through the adapter from a flow opening in the free nozzle end of the second connecting nozzle to the first flow opening of the first connecting nozzle; and
a second flow channel extending through the adapter from a flow opening in the free nozzle end of the third connecting nozzle to the second flow opening of the first connecting nozzle, wherein the second flow channel is separated from the first flow channel; and
a projection disposed at the free nozzle end of the first connecting nozzle on the separator between the first flow opening and the second flow opening and extending outwardly from the free nozzle end of the first connecting nozzle with a length to a free projection end remote from the free nozzle end,
wherein the first end of the first fluid line is connected to the first connecting nozzle of the adapter such that the projection of the adapter protrudes into the lumen of the first fluid line to form in the first fluid line a tubular first chamber communicating with the first flow channel of the adapter and a tubular second chamber communicating with the second flow channel of the adapter, wherein the two tubular chambers are mutually separated by the projection.

2. The fluid line system as claimed in claim 1, wherein the first fluid line is a distributor piece of a measuring transducer, wherein the distributor piece is formed as a line branching or a line junction, and wherein the measuring transducer is a vibronic measuring transducer and/or a measuring transducer of a Coriolis mass flow measuring device.

3. The fluid line system as claimed in claim 1, wherein the projection has a contour complementary to a contour of a wall of a longitudinal section of the first fluid line, and
wherein the projection has a breadth that is less than a caliber of the first fluid line and/or less than a diameter of the first flow opening of the first fluid line.

4. The fluid line system as claimed in claim 1, wherein a first portion of a lateral surface of the projection contacts a corresponding first portion of the wall of the first fluid line to form a seal limiting or impeding a flowing through of fluid, and a second portion of the lateral surface remote from the first portion of the lateral surface contacts a corresponding second portion of the wall of the first fluid line remote from the first portion of the wall to form a seal limiting or impeding a flowing through of fluid.

5. The fluid line system as claimed in claim 1, wherein the lumen of the first fluid line has a length measured as a shortest separation between the first line end and the second line end, and the length of the projection is less than or equal to the length of the lumen of the first fluid line.

6. The fluid line system as claimed in claim 5, wherein the first fluid line has within its lumen a plate-shaped partition extending from a region between the second flow opening and the third flow opening with a length less than the length of the lumen of the first fluid line and a breadth equal to a caliber of the first fluid line and/or equal to a diameter of the first flow opening.

7. The fluid line system as claimed in claim 1, further comprising:
   a second fluid line embodied as a rigid and/or at least sectionally circularly cylindrical tube, having a lumen enveloped by a wall and extending from a first flow opening in a first line end of the second fluid line to a second flow opening in a second line end of the second fluid line; and
   a third fluid line embodied as a rigid and/or at least sectionally circularly cylindrical tube, having a lumen enveloped by a wall and extending from a first flow opening in a first line end of the third fluid line to a second flow opening in a second line end of the third fluid line,
   wherein both the first line end of the second fluid line and the first line end of the third fluid line are connected with the second line end of the first fluid line such that both the lumen of the second fluid line and the lumen of the third fluid line communicate with the lumen of the first fluid line, and
   wherein the first flow channel of the adapter communicates with the lumen of the second fluid line via the first chamber of the first fluid line and the second flow channel of the adapter communicates with the lumen of the third fluid line via the second chamber of the first fluid line.

8. The fluid line system as claimed in claim 7, wherein a diameter of the first flow opening of the second fluid line is less than the breadth of the projection of the first fluid line; and
wherein a diameter of the first flow opening of the third fluid line is less than the breadth of the projection of the first fluid line.

9. The fluid line system as claimed in claim 7, wherein the second fluid line and the third fluid line are components of a measuring transducer, a vibronic measuring transducer, or a magneto inductive measuring transducer, serving for generating at least one measurement signal corresponding to at least one measured variable.

10. The fluid line system as claimed in claim 7, wherein the second fluid line and the third fluid line are adapted to be flowed through by fluid and, during that, to be caused to vibrate.

11. The fluid line system as claimed in claim 7, further comprising:
   an electromechanical oscillation exciter for exciting and maintaining mechanical oscillations and bending oscillations of both the second fluid line and the third fluid line;
   a first sensor mounted on the second fluid line for producing an electrical, first measurement signal corresponding to a measured variable of a fluid guided in the fluid line system, wherein the first measurement signal has at least one signal parameter dependent on the measured variable; and
   a measuring and operating electronics electrically coupled with the first sensor and with the oscillation exciter, wherein the measuring and operating electronics is adapted to supply an electrical exciter signal to the oscillation exciter and is further adapted to process the first measurement signal and to ascertain from the first measurement signal measured values for the measured variable.

12. The fluid line system as claimed in claim 11, further comprising:
   a second sensor mounted on the second fluid line for producing an electrical second measurement signal corresponding to the measured variable.

13. The fluid line system as claimed in claim 11, further comprising:
   a fourth fluid line having a lumen enveloped by a metal wall and extending from a first flow opening in a first line end of the fourth fluid line to a second flow opening in a second line end of the fourth fluid line and to a third flow opening spaced from the second flow opening in the second line end of the fourth fluid line,
   wherein the second line end of the fourth fluid line is connected with the second line end of the second fluid line and to the second line end of the third fluid line such that both the lumen of the second fluid line and the lumen of the third fluid line communicate with the lumen of the fourth fluid line.

14. The fluid line system as claimed in claim 13, further comprising:
   a fifth fluid line having a lumen enveloped by a metal wall and extending from a first flow opening in a first line end of the fifth fluid line to a second flow opening in a second line end of the fifth fluid line; and
   a sixth fluid line having a lumen enveloped by a metal wall and extending from a first flow opening in a first line end of the sixth fluid line to a second flow opening in a second line end of the sixth fluid line,
   wherein the fifth fluid line is connected with its first line end to the second connecting nozzle of the adapter such that the lumen of the fifth fluid line communicates with the first flow channel of the adapter, and
   wherein the sixth fluid line is connected with its first line end to the third connecting nozzle of the adapter such that the lumen of the sixth fluid line communicates with the second flow channel of said adapter.

15. The fluid line system as claimed in claim 11, further comprising:
a protective housing having a cavity encased by a metal wall, wherein the second fluid line and the third fluid line are placed within the protective housing.

16. The fluid line system as claimed in claim 15,
wherein a first housing end of the protective housing is formed by the first fluid line such that the first fluid line is an integral component of the protective housing and that the protective housing has, laterally limiting the cavity, a side wall affixed laterally on the first fluid line, and
wherein a second housing end of the protective housing is formed by the fourth fluid line such that the first fluid line and the fourth fluid line are integral components of the protective housing.

\* \* \* \* \*